United States Patent
Kamma

(10) Patent No.: US 9,507,796 B2
(45) Date of Patent: Nov. 29, 2016

(54) RELAY APPARATUS AND IMAGE PROCESSING DEVICE

(71) Applicant: BROTHER KOGYO KABUSHIKI KAISHA, Nagoya-shi, Aichi-ken (JP)

(72) Inventor: Yui Kamma, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 407 days.

(21) Appl. No.: 14/036,161

(22) Filed: Sep. 25, 2013

(65) Prior Publication Data

US 2014/0095557 A1 Apr. 3, 2014

(30) Foreign Application Priority Data

Sep. 28, 2012 (JP) .................. 2012-216077

(51) Int. Cl.
*G06F 7/00* (2006.01)
*G06F 17/30* (2006.01)
(Continued)

(52) U.S. Cl.
CPC ... *G06F 17/30194* (2013.01); *G06F 17/30728* (2013.01); *G06F 17/30864* (2013.01); *H04N 1/00209* (2013.01); *H04N 1/00244* (2013.01); *H04N 1/00413* (2013.01); *H04N 1/00424* (2013.01); *H04N 1/00464* (2013.01); *H04N 1/00474* (2013.01); *H04N 1/32122* (2013.01); (Continued)

(58) Field of Classification Search
CPC ............... G06F 17/30728; G06F 17/30864
USPC ....................................... 707/927
See application file for complete search history.

(56) References Cited

U.S. PATENT DOCUMENTS 8,819,553 B2 * 8/2014 Wood et al. .................. 715/716
2005/0251748 A1 11/2005 Gusmorino et al.
(Continued)

FOREIGN PATENT DOCUMENTS

CN 1770141 A 5/2006
CN 1801147 A 7/2006
(Continued)

OTHER PUBLICATIONS

Chinese Office Action issued in corresponding Chinese Patent Application No. 201310447009.2, mailed Sep. 30, 2015.
(Continued)

*Primary Examiner* — Mark E Hershley
(74) *Attorney, Agent, or Firm* — Merchant & Gould P.C.

(57) ABSTRACT

The information processing device may determine a file type of a send file which is a file to be sent to the storage device and to be stored in the storage device. The information processing device may acquire a plurality of stored tag information from the storage device. The stored tag information may be tag information associated with a stored file which is a file stored in the storage device. The information processing device may cause a display unit to display one or more stored tag information among the acquired plurality of stored tag information. The information processing device may store, in association with the send file, at least one selected tag information into the storage device. The information processing device may cause the display unit to display a first group of stored tag information in preference to a second group of stored tag information.

23 Claims, 15 Drawing Sheets

(51) Int. Cl.
*H04N 1/00* (2006.01)
*H04N 1/32* (2006.01)

(52) U.S. Cl.
CPC ............... *H04N 2201/0039* (2013.01); *H04N 2201/0094* (2013.01); *H04N 2201/3202* (2013.01); *H04N 2201/3204* (2013.01); *H04N 2201/328* (2013.01); *H04N 2201/3214* (2013.01); *H04N 2201/3243* (2013.01); *H04N 2201/3273* (2013.01); *H04N 2201/3274* (2013.01); *H04N 2201/3276* (2013.01); *H04N 2201/3278* (2013.01)

(56) References Cited

U.S. PATENT DOCUMENTS

| | | | |
|---|---|---|---|
| 2006/0095830 A1 | 5/2006 | Krishna et al. | |
| 2006/0176509 A1* | 8/2006 | Aoki et al. | 358/1.15 |
| 2007/0078832 A1* | 4/2007 | Ott et al. | 707/3 |
| 2007/0133064 A1 | 6/2007 | Itogawa et al. | |
| 2007/0226606 A1 | 9/2007 | Noyes et al. | |
| 2007/0288426 A1 | 12/2007 | Schachter | |
| 2008/0188209 A1* | 8/2008 | Dorogusker et al. | 455/414.2 |
| 2008/0208829 A1* | 8/2008 | Limonov | 707/4 |
| 2008/0263140 A1* | 10/2008 | Yoshikawa et al. | 709/203 |
| 2009/0024637 A1 | 1/2009 | Krishna et al. | |
| 2010/0037149 A1 | 2/2010 | Heath | |
| 2011/0016150 A1 | 1/2011 | Engstr m et al. | |
| 2011/0043437 A1 | 2/2011 | Tang et al. | |
| 2011/0295851 A1 | 12/2011 | El-Saban et al. | |

FOREIGN PATENT DOCUMENTS

| | | |
|---|---|---|
| CN | 102473186 A | 5/2012 |
| JP | 2007-048161 A | 2/2007 |
| JP | 2007-188479 A | 7/2007 |
| JP | 2009-20790 A | 1/2009 |
| JP | 2012-98941 A | 5/2012 |
| WO | 2008/097706 A1 | 8/2008 |
| WO | 2011/084092 A1 | 7/2011 |

OTHER PUBLICATIONS

European Search Report issued in EP 13 18 5977.9, Dec. 11, 2013.
Office Action issued in related Japanese application No. 2012-216077, mailed Dec. 22, 2015.
Office Action issued in related Chinese application No. 201310447009.2, Apr. 12, 2016.
Office Action issued in related Japanese application No. 2012-216077, mailed Jul. 5, 2016.
Office Action issued in related European application No. 13 185 977.9, mailed Oct. 10, 2016.

* cited by examiner

FIG. 10

| 800 | 801 | 802 | 803 | 804 | 805 | 806 | 807 | 808 Use History | | | | |
|---|---|---|---|---|---|---|---|---|---|---|---|---|
| User ID | Password | Service Name | Stored Tag ID | Store Tag Content | File Type | File Format | Last Used Date | doc | xls | pdf | jpg | png |
| User ID of User A | 1234 | Service A | aaa | Meeting Minutes | doc | Office | 2010/5/30 | 32 | 2 | 0 | 0 | 0 |
| | | | eee | Material | pdf | Office | 2011/7/10 | 0 | 0 | 22 | 0 | 0 |
| | | | fff | Travel | jpg | Picture | 2009/4/8 | 0 | 0 | 0 | 120 | 0 |
| | | | ggg | Pet | png | Picture | 2011/12/1 | 0 | 0 | 0 | 0 | 85 |
| | 5678 | Service B | mmm | Work | doc | Office | 2011/6/11 | 11 | 0 | 0 | 0 | 0 |
| | | | mmm | Work | doc | Office | 2011/6/12 | 50 | 0 | 0 | 0 | 3 |
| User ID of User B | 7777 | Service A | nnn | Report | doc | Office | 2010/11/3 | 100 | 0 | 0 | 0 | 0 |
| | | | ... | ... | ... | ... | ... | ... | ... | ... | ... | ... |
| | 9876 | Service B | ooo | Person | jpg | Picture | 2012/1/20 | 0 | 0 | 0 | 0 | 0 |
| | | | ... | ... | ... | ... | ... | ... | ... | ... | ... | ... |
| Shared Account ID | — | Service A | rrr | Work | doc | Office | 2012/9/1 | 6 | 2 | 0 | 200 | 0 |
| | — | Service B | ... | ... | ... | ... | ... | ... | ... | ... | ... | ... |

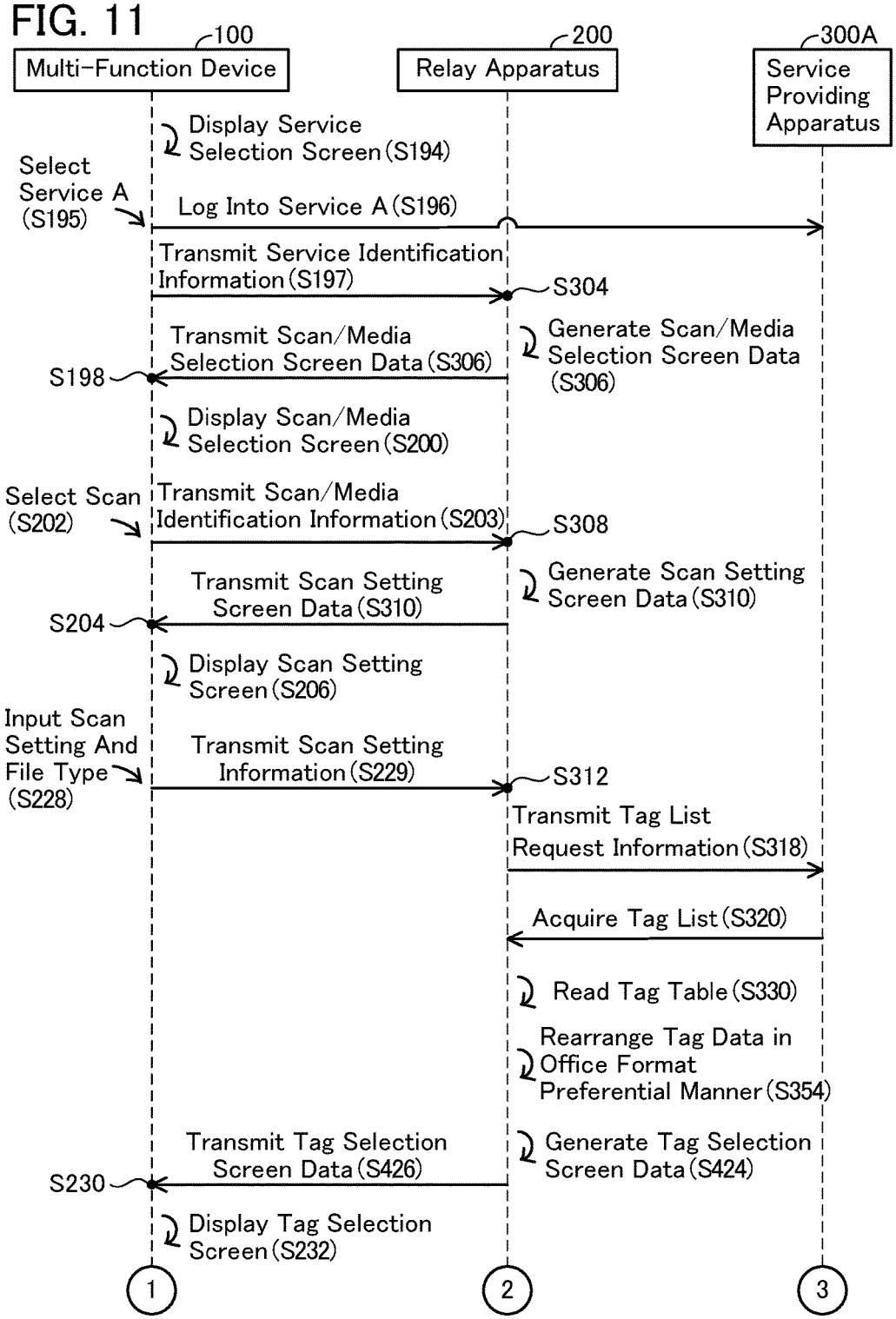

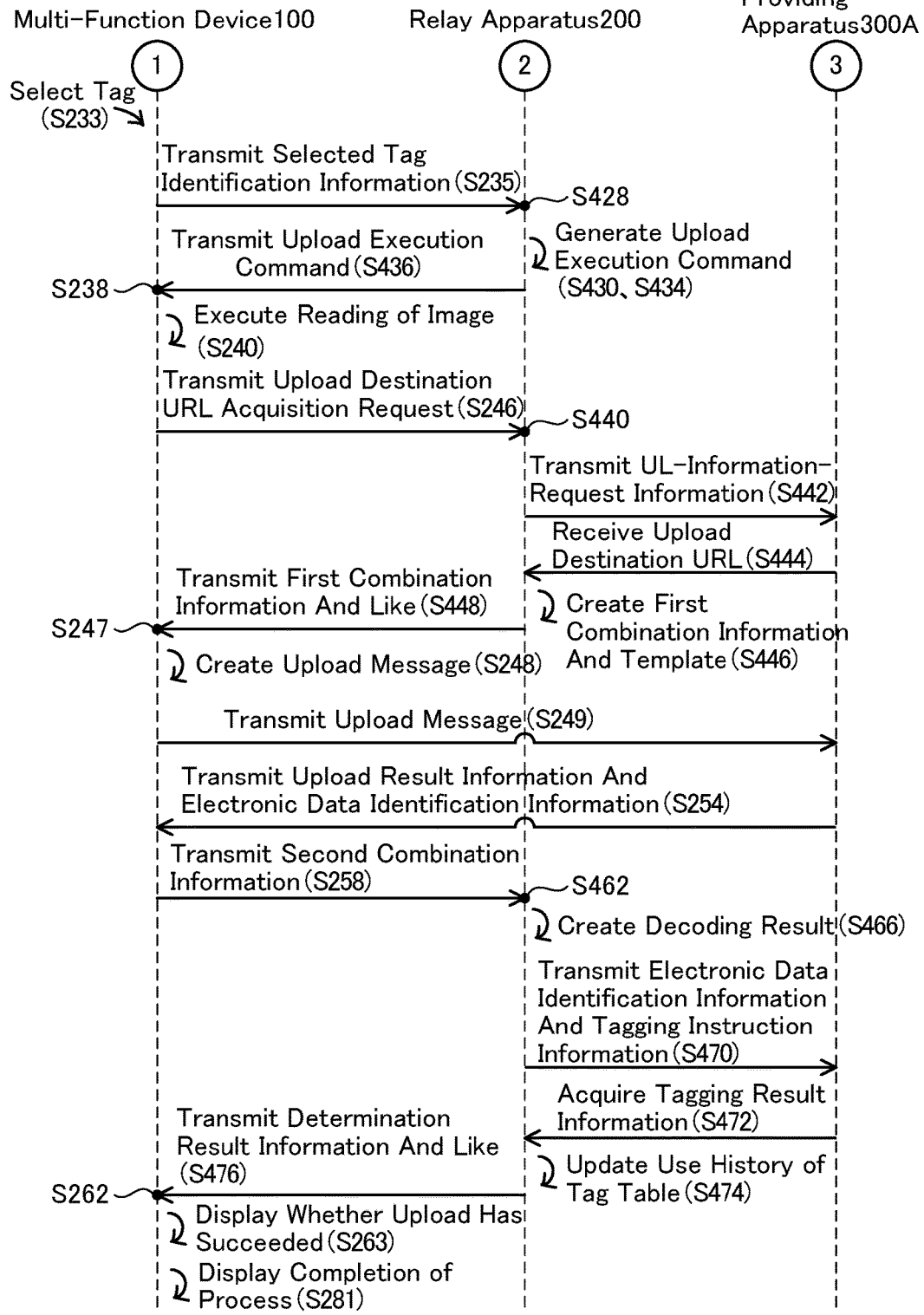

RELAY APPARATUS AND IMAGE PROCESSING DEVICE

CROSS-REFERENCE TO RELATED APPLICATIONS

This application claims priority to Japanese Patent Application No. 2012-216077, filed on Sep. 28, 2012, the contents of which are hereby incorporated by reference into the present application.

TECHNICAL FIELD

The technique disclosed in the present specification to an information processing device or the like that is configured to communicate with device that tag information in association with a file.

DESCRIPTION OF RELATED ART

In the related art, a technique of registering an image file or a document file in a file management device in association with tags when storing the file in the file management device is known. A technique of displaying candidates for tags, created by a scan image management server as the file management device, on an MFP, and registering tags designated by a user among the displayed candidates for tags in the scan image management server in association with a scan image scanned by the MFP is known. In this technique, the displayed candidates for tags are tags stored in advance in the scan image management server, tags correlated with the scan images stored in the scan image management server, and the like.

SUMMARY

In the known technique, list correlated with the scan images stored in the scan image management server is displayed as the candidates. In this case, the larger the number of tags correlated with the scan images, the larger the number of displayed candidates for tags. Thus, the operability when the user selects a desired tag from the candidates for tags may deteriorate.

In one aspect of the teachings disclosed herein, an information processing device configured to communicate with a storage device may be provided. The information processing device may comprise a processor, a network interface, and a memory configured to store computer-readable instructions therein. The computer-readable instructions, when executed by the processor, may cause the information processing device to perform determining a file type of a send file which is a file to be sent to the storage device and to be stored in the storage device. The computer-readable instructions may cause the information processing device to perform acquiring a plurality of stored tag information from the storage device via the network interface.

The stored tag information may be tag information associated with a stored file which is a file stored in the storage device. The computer-readable instructions may cause the information processing device to perform causing a display unit to display one or more stored tag information among the acquired plurality of stored tag information. The computer-readable instructions may cause the information processing device to perform storing, in association with the send file, at least one selected tag information into the storage device. The selected tag information may be tag information selected from among the one or more stored tag information displayed on the display unit. The causing may include causing the display unit to display a first group of stored tag information in preference to a second group of stored tag information. The first group of stored tag information may be tag information associated with a first group of stored file which is related to the determined file type of the send file. The second group of stored tag information may be tag information associated with a second group of stored file which is not related to the determined file type of the send file.

BRIEF DESCRIPTION OF DRAWINGS

FIG. 10 shows an example of a tag table; FIG. 11 is a sequence diagram for explaining an operation example of the service cooperation system 10; FIG. 12 is a sequence diagram for explaining an operation example of the service cooperation system 10.

EMBODIMENT

Hereinafter, exemplary embodiments of the present invention will be described with reference to the accompanying drawings. The drawings to be referred to are used for explaining technical features usable in the present invention. Configurations of devices, flowcharts of various processes, and the like to be described below are simple explanation examples. They are not intended to limit the present invention.

<Outline of Service Cooperation System 10>

Figure 1:
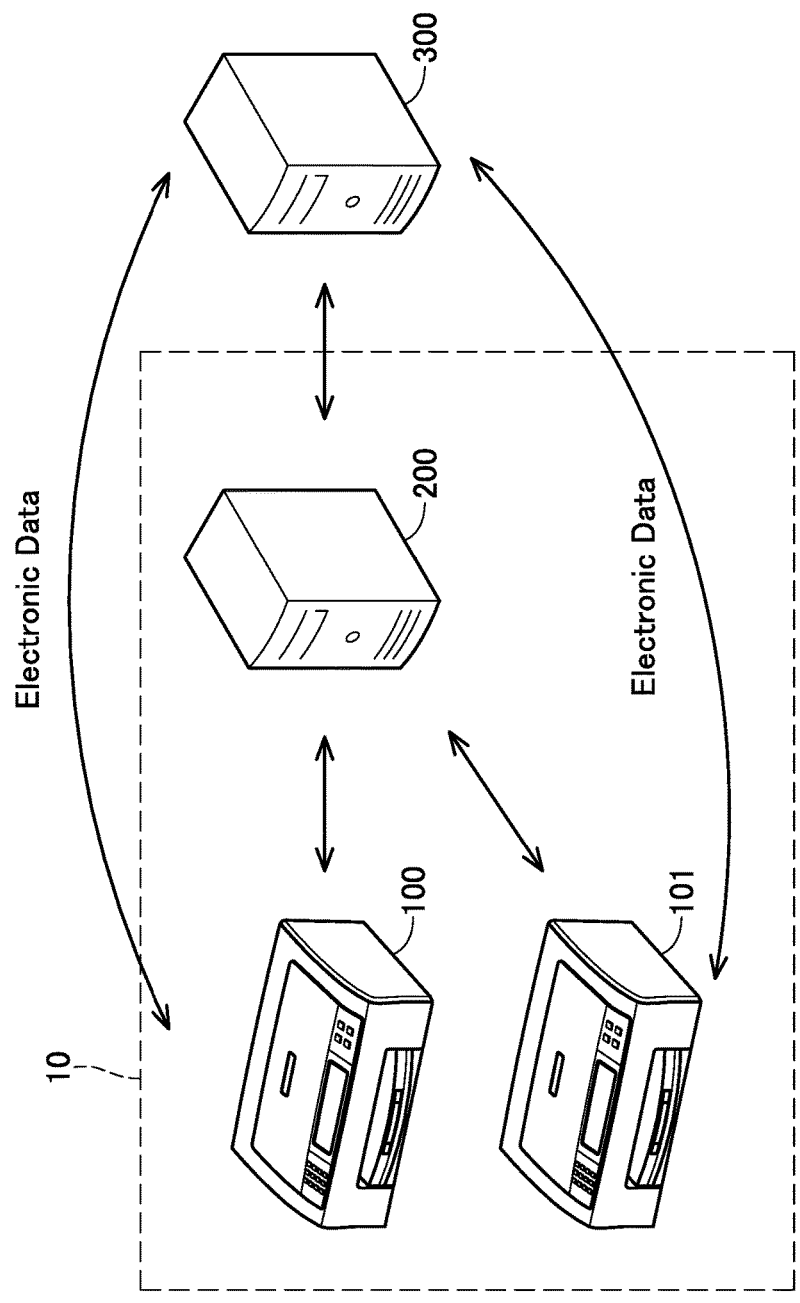
FIG. 1 shows an outline of service cooperation system 10 according to an embodiment.

An outline of a service cooperation system 10 will be described with reference to FIG. 1. The service cooperation system 10 includes multi-function devices 100 and 101, and a relay apparatus 200. The relay apparatus 200 is connected to the multi-function devices 100 and 101 via a network. The service cooperation system 10 can perform upload or download of an electronic data in an electronic-data storing service which a service provider provides. When a plurality of users A and B is present, the electronic data storing service can provide a storage area to each of the users A and B. The users A and B can be identified by a user ID or the like used when the user logs into the electronic data storing service.

The electronic data storing service is a service providing apparatus 300 that each service provider provides on the Internet. Alternatively, the electronic data storing service is a group of devices on the Internet, including at least the service providing apparatus 300. The electronic data storing service performs HTTP or HTTPS communication with out-of-service terminals connected to the Internet and stores electronic data uploaded by the out-of-service terminals.

The service providing apparatus 300 may have the function of a known Web server. The service providing apparatus 300 may have the function of a storage server that receives electronic data from a communication server that performs HTTP or HTTPS communication with out-of-service terminals and stores the electronic data. The service providing apparatus 300 may be a large-sized computer device and may be a personal computer.

Figure 13:
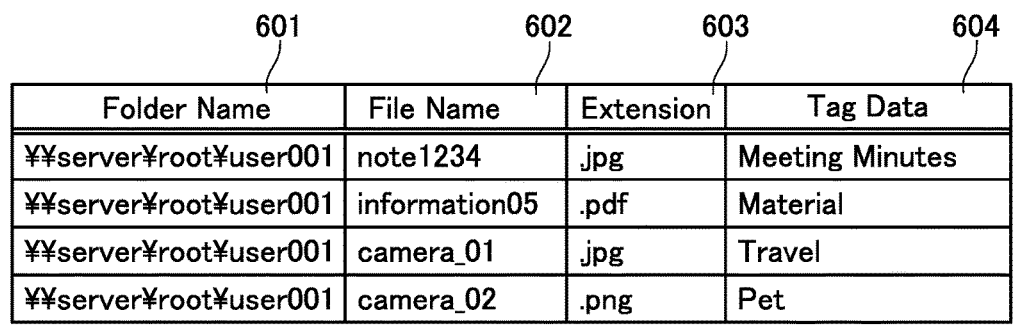
FIG. 13 is a diagram showing an example of data added to electronic data.

FIG. 13 shows an example of electronic data that the user A stores in a service providing apparatus 300A. Data such as a folder name 601, a file name 602, an extension 603, and tag data 604 can be added to each of a plurality of electronic data. The folder name 601 is information that indicates a storage location of electronic data. Thus, a plurality of folder names 601 cannot be added to one electronic data. Further, the folder name 601 is uniquely determined when electronic data is stored. The file name 602 is information that identifies respective electronic data. Thus, a plurality of electronic data stored in the same folder cannot be added to one file name 602. Moreover, a plurality of file names 602 cannot be added to one electronic data. The extension 603 is information that indicates the format of electronic data. Thus, a plurality of extensions 603 cannot be added to one electronic data. Further, the extension 603 is uniquely determined by the format of electronic data when the electronic data is created. The tag data 604 is data that can be added to electronic data separately from the data such as the folder name 601, the file name 602, and the extension 603. The user of the electronic data storing service can determine tag data to be used as a keyword regardless of the file name, format, and storage location of the electronic data. The tag data is data that has characteristics different from the other data that can be added to electronic data. That is, one tag data can be added to a plurality of electronic data. Moreover, a plurality of tag data can be added to one electronic data.

The advantages of tag data will be described with reference to FIG. 13, When a user designates a search keyword "meeting," the user can retrieve electronic data of which the file name 602 is "note1234" and to which tag data 604 "Meeting Minutes" is added. That is, the tag data 604 added to electronic data can be used as a keyword for retrieving the electronic data.

Moreover, the user A can upload electronic data to a storage area for the user A of the service providing apparatus 300A by using one of the plurality of multi-function devices 100 and 101. In this case, the user A needs to log into the service providing apparatus 300A from one of the respective multi-function devices 100 and 101.

Figure 14:
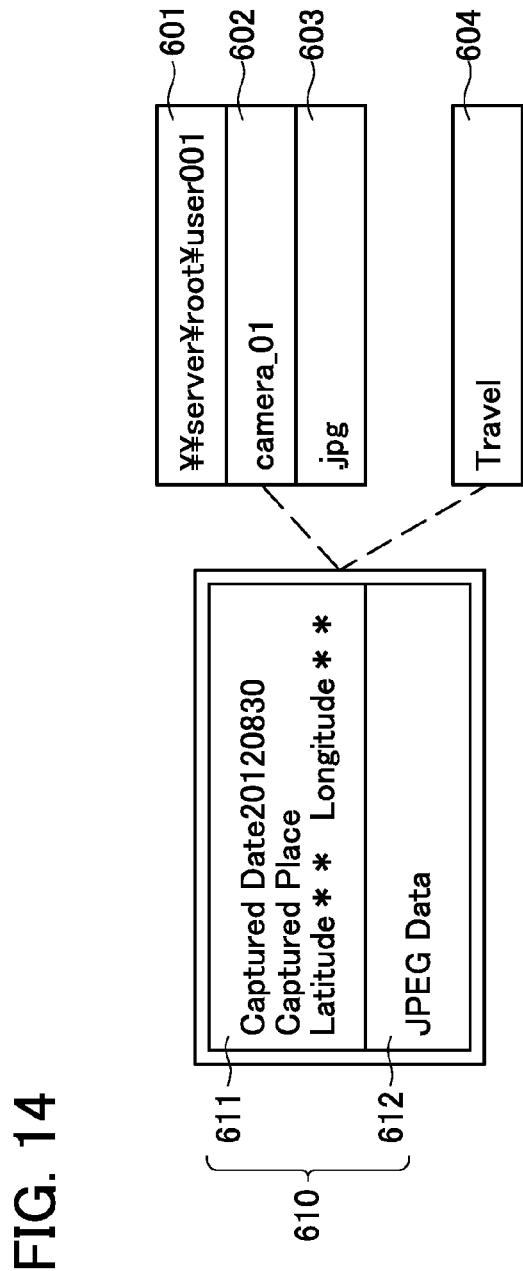
FIG. 14 shows an example of the structure of electronic data.

FIG. 14 shows an example of the structure of electronic data stored in the service providing apparatus 300A. Electronic data 610 shown in FIG. 14 is electronic data of which the folder name 601 is "¥¥server¥root¥user001," the file name 602 is "camera_01," and the extension 603 is ".jpg." The electronic data 610 includes auxiliary data 611 and a body portion 612. The auxiliary data 611 is metadata related to capturing conditions such as a captured date and a captured location. Exif (abbreviation of Exchangeable image file format) is an example of the standard of the auxiliary data 611. The body portion 612 is an entity portion of JPEG data. The tag data 604 can be added to the electronic data 610 regardless of the presence or content of the auxiliary data 611. Moreover, the auxiliary data 611 may have various contents. For example, when the body portion 612 is document data, the content of the auxiliary data 611 may be an author, a page layout, or a page count.

An example of the multi-function device 100 is a small-sized digital combined machine. The multi-function device 100 has a print function, a scanner function, a fax function, a copy function, and a function of executing write and read processes on external storage media. A user of the multi-function device 100 can read images by using the scanner function of the multi-function device 100 and upload electronic data of the read images in the electronic-data storing service. Further, the user of the multi-function device 100 can download electronic data in the electronic-data storing service, and print the downloaded electronic data by the print function of the multi-function device 100. The small-sized digital combined machine is also an example of the multi-function device 101.

The multi-function device 100 uploads or downloads electronic data in cooperation with the relay apparatus 200. The multi-function device 100 obtains URLs in the electronic-data storing service through the relay apparatus 200. The URLs include an upload destination URL which is an URL of an upload destination of an electronic data to the electronic-data storing service, an electronic-data URL which is a URL of an electronic data to be downloaded from the electronic-data storing service, and so on. However, in order to transmit or receive binary data of an electronic data having a large amount of data, the multi-function devices 100 and 101 communicate directly with the electronic-data storing service without using the relay apparatus 200. Therefore, according to the service cooperation system 10, it is possible to suppress an amount of data passing through the relay apparatus 200. Further, it is possible to suppress a load on the relay apparatus 200.

The relay apparatus 200 may be a known apparatus having a server function. The relay apparatus 200 may also be prepared by a maker of the multi-function device 100. Alternatively, it can also be considered to use, as the relay apparatus 200, a known rental server or a virtual machine which functions as a server in cooperation with a plurality of physical apparatuses. In this case, the operational cost of the relay apparatus 200 changes depending to the amount of data passing through the relay apparatus 200 and a load on the relay apparatus 200 for processing. Therefore, in the case of using a rental server or a virtual machine, the operational cost of the relay apparatus 200 can be suppressed by reducing the amount of data passing through the relay apparatus 200 or reducing the load on the relay apparatus 200. Further, even in a case where the relay apparatus 200 is prepared by the maker, since the relay apparatus 200 does not need high processing performance, the equipment investment for the relay apparatus can be suppressed.

<Hardware Configuration of Service Cooperation System 10>

Figure 2:
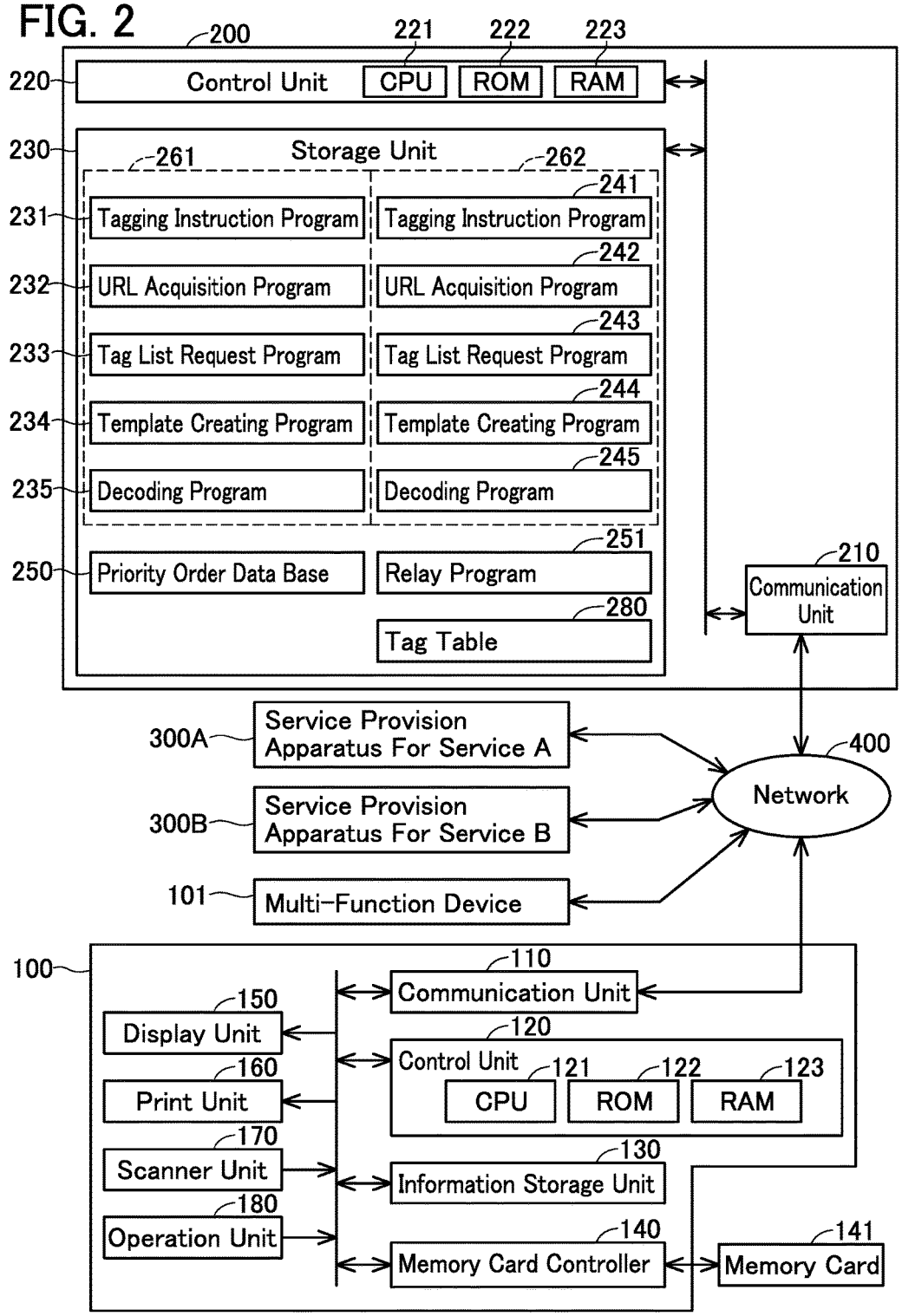
FIG. 2 shows a hardware configuration of the service cooperation system 10.

A hardware configuration of the service cooperation system 10 will be described with reference to FIG. 2, The following description will be made on assumption that the service cooperation system 10 performs cooperation of two electronic-data storing services, that is, a service A and a service B. In the following description, a service providing apparatus 300 for the service A is referred to as a service providing apparatus 300A. Also, a service providing apparatus 300 for the service B is referred to as a service providing apparatus 300B. In a case where it is unnecessary to particularly distinguish both sides from each other, the service providing apparatus 300A and the service providing apparatus 300B are generally referred to as the service providing apparatus 300. The multi-function devices 100 and 101, the relay apparatus 200, the service providing apparatus 300A, and the service providing apparatus 300B arc connected to one another through a network 400. As the network 400, for example, an Internet network can be used.

The multi-function devices 100 and 101, the relay apparatus 200, and the service providing apparatus 300 perform data transmission and reception with one another on the basis of HTTP.

A hardware configuration of the multi-function device 100 will be described. The multi-function device 100 includes a communication unit 110, a control unit 120, an information storage unit 130, a memory card controller 140, a display unit 150, a print unit 160, a scanner unit 170, and an operation unit 180. The communication unit 110 is a device for performing communication with other devices connected to the network. As the communication unit 110, a known network card can be used. The control unit 120 includes a CPU 121, and a ROM 122 and RAM 123 connected to the CPU 121. The CPU 121 controls the operation of the multi-function device 100 according to programs stored in the ROM 122. The RAM 123 is a storage device for temporarily storing various types of data.

The information storage unit 130 is a non-volatile storage device such as a NAND-type flash memory. The information storage unit 130 stores various types of setting information such as user identification information for identifying a user of the multi-function device 100. Moreover, the information storage unit 130 stores the predetermined character string. The predetermined character string may be stored in advance by the manufacturer of the multi-function device 100. When a plurality of users shares one multi-function device 100, the user identification information of a logged-in user may be stored in the information storage unit 130.

The memory card controller 140 controls the memory of a memory card 141 connected to the multi-function device 100. Specifically, the memory card controller 140 performs writing of data in the memory card 141, erasing of data stored in the memory card 141, reading of data stored in the memory card 141, or the like, on the basis to an instruction of the control unit 120. In the memory card 141, electronic data having a predetermined format is stored.

The display unit 150 is a display device having a display such as a known LCD. The display unit 150 displays predetermined information such as a menu item selection screen, on the basis of an instruction form the control unit 120. The print unit 160 is a device which prints images according to an instruction of the control unit 120. The scanner unit 170 is a device that reads images recorded on a sheet set by a user. The scanner unit 170 reads images according to an instruction of the control unit 120. The operation unit 180 is a device that includes a plurality of operation buttons operable by the user, and transmits signals based on the pushing operation of the user to the control unit 120. The user can input a desired instruction by operating the operation unit 180. The multi-function device 101 has the same hardware configuration as the multi-function device 100, and description thereof will not be provided.

A hardware configuration of the relay apparatus 200 will be described. The description of the present exemplary embodiment will be made on assumption that the relay apparatus 200 is a physically existing server. Incidentally, the relay apparatus 200 may be a virtual machine which functions as server in cooperation with a plurality of physical devices as described above.

The relay apparatus 200 includes a communication unit 210, a control unit 220, and an information storage unit 230. The communication unit 210 is a device for performing communication with other devices connected to the network. As the communication unit 210, a known network card can be used. The control unit 220 includes a CPU 221, and a ROM 222 and RAM 223 connected to the CPU 221.

The CPU 221 controls the operation of the relay apparatus 200 according to programs stored in the ROM 222 and the information storage unit 230. The RAM 223 is a storage device for temporarily storing various types of data.

The information storage unit 230 is a non-volatile storage device such as a hard disk drive. The information storage unit 230 stores a program group 261 which is programs for the service A and a program group 262 which is programs for the service B. The program group 261 includes a plurality of software modules that includes a tagging instruction program 231, a URL acquisition program 232, a tag list request program 233, a template creating program 234, and a decoding program 235. The tagging instruction program 231 is a program for transmitting tagging instruction information described later to the service providing apparatus 300A using an open API of the service A. The URL acquisition program 232 is a program for transmitting UL-information-request information described later to the service providing apparatus 300A using an open API of the service A. The UL-information-request information is a word coined in the present exemplary embodiment, representing information for requesting information necessary for uploading. The tag list request program 233 is a program for transmitting tag list request information described later to the service providing apparatus 300A using an open API of the service A. The template creating program 234 is a program for creating a template for an upload message which is a message used when uploading electronic data to the service A. The decoding program 235 is a program for decoding a response message from the service providing apparatus 300A.

Moreover, the program group 262 includes a plurality of software modules which includes a tagging instruction program 241, a URL acquisition program 242, a tag list request program 243, a template creating program 244, and a decoding program 245. The tagging instruction program 241 is a program for transmitting tagging instruction information to the service providing apparatus 300B using an open API of the service B. The URL acquisition program 242 is a program for transmitting UL-information-request information to the service providing apparatus 300B using an open API of the service B. The tag list request program 243 is a program for transmitting tag list request information to the service providing apparatus 300B using an open API of the service B. The template creating program 244 is a program for creating a template for an upload message which is a message used when uploading electronic data to the service B. The decoding program 245 is a program for decoding a response message from the service providing apparatus 300B.

Moreover, the information storage unit 230 stores a tag table 280. The tag table 280 is a database for recording stored tag data that has been stored in the services A and B. FIG. 10 shows an example of the tag table 280. The tag table 280 stores a user ID 800, a password 801, a service name 802, a stored tag ID 803, a stored tag content 804, a file type 805, a file format 806, a last used date 807, and a use history 808.

The user ID 800 is information for identifying a user that has stores stored tag data. In the tag table 280 of FIG. 10, a user ID of the user A, a user ID of the user B, and shared account ID are stored as the user ID 800. The user ID of the user A is information for identifying the user A. The user ID of the user B is information for identifying the user B. The shared account ID is an ID that can be used in common by the users A and B.

The password 801 is authentication information used for logging into a service. The password 801 is set to the user ID 800 of the users A and B. However, the password 801 is not set to the user ID 800 of the shared account ID. That is, the shared account ID is an ID that allows users to log into a service without inputting a password. Due to this, the user A can upload highly confidential electronic data that the user A does not want to be seen by others such as the user B to a storage area which the user A only can access by logging into the service using the user ID 800 of the user A and the password 801 of the user A. On the other hand, the user A can upload less confidential electronic data that the user A wants to share with others such as the user B to a storage area which a plurality of users such as the users A and B can access by logging into the service using the shared account.

The service name 802 is information for identifying the type of a service in which the stored tag data has been stored. The stored tag ID 803 is information for identifying stored tag data that has been stored in the service. The stored tag content 804 is a character string represented by tag data that is identified by the stored tag ID 803.

The file type 805 is information representing the type of electronic data that is correlated with the stored tag ID 803. The file type 805 is represented by an extension. "doe" represents a file that is used by word processor software. "xls" represents a file that is used by spreadsheet software. "pdf" represents a file that is created in the format of electronic documents. "jpg" and "png" represent picture files.

The file format 806 is information representing a class to which each of the plurality of file types 805 belongs. The file format 806 includes "Office" and "Picture," for example. The file type 805 (for example, "doc," "xls," and "pdf") that handles papers belongs to the file format 806 of "Office." Moreover, the file type 805 (for example, "jpg" and "png") that handles pictures belongs to the file format 806 of "Picture."

The last used date 807 is information representing the date when the stored tag ID 803 was most recently used. The use history 808 is information representing the history showing how often tag data and file types were associated with each other. A file type of which the use history 808 is the largest may be correlated as the file type 805. For example, in FIG. 10, tag data (see Area R21) of the tag content 804 of "Meeting Minutes" is associated "32 times," which is the largest number, to the electronic data of the file type "doc" (see Area R22). Thus, the file type 805 of "doc" is correlated with the tag data of the tag content 804 of " Meeting Minutes" (see Area R23).

Moreover, the information storage unit 230 stores a relay program 251. The relay program 251 is a program for relaying the communication between the multi-function devices 100 and 101 and the service providing apparatus 300 in cooperation with the plurality of modules.

The user of the multi-function devices 100 and can designate a desired service of a plurality of electronic-data storing services. Then, the user of the multi-function devices 100 and 101 can upload desired electronic data in the designated service. Further, the user of the multi-function devices 100 and 101 can select whether to upload electric data of an image read by the scanner unit 170 or to upload existing electronic data stored in the memory card 141.

<Operation of Multi-Function Device 100>

Figure 3:
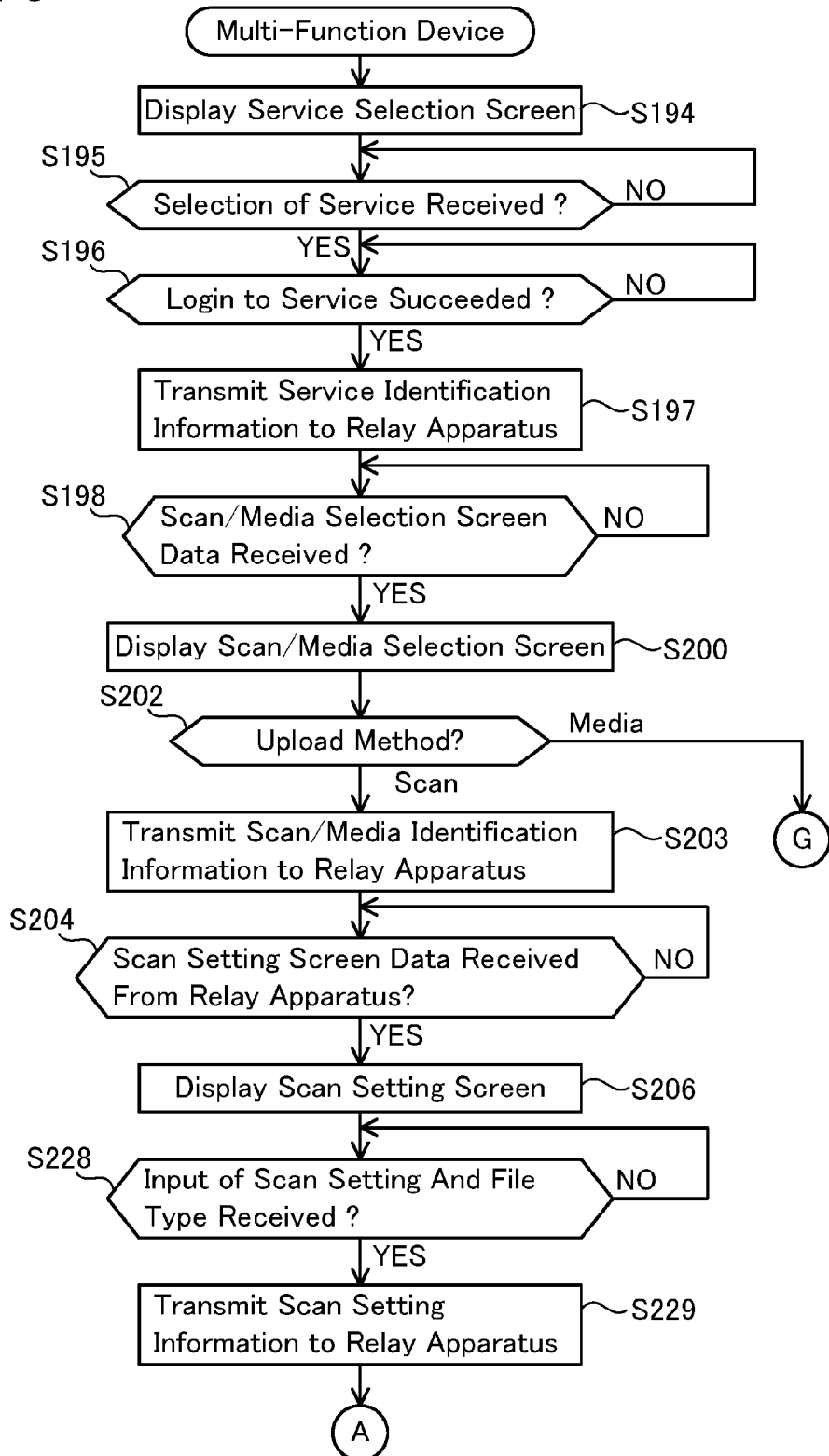
FIG. 3 is a flowchart for explaining an operation of a multi-function device 100.
Figure 4:
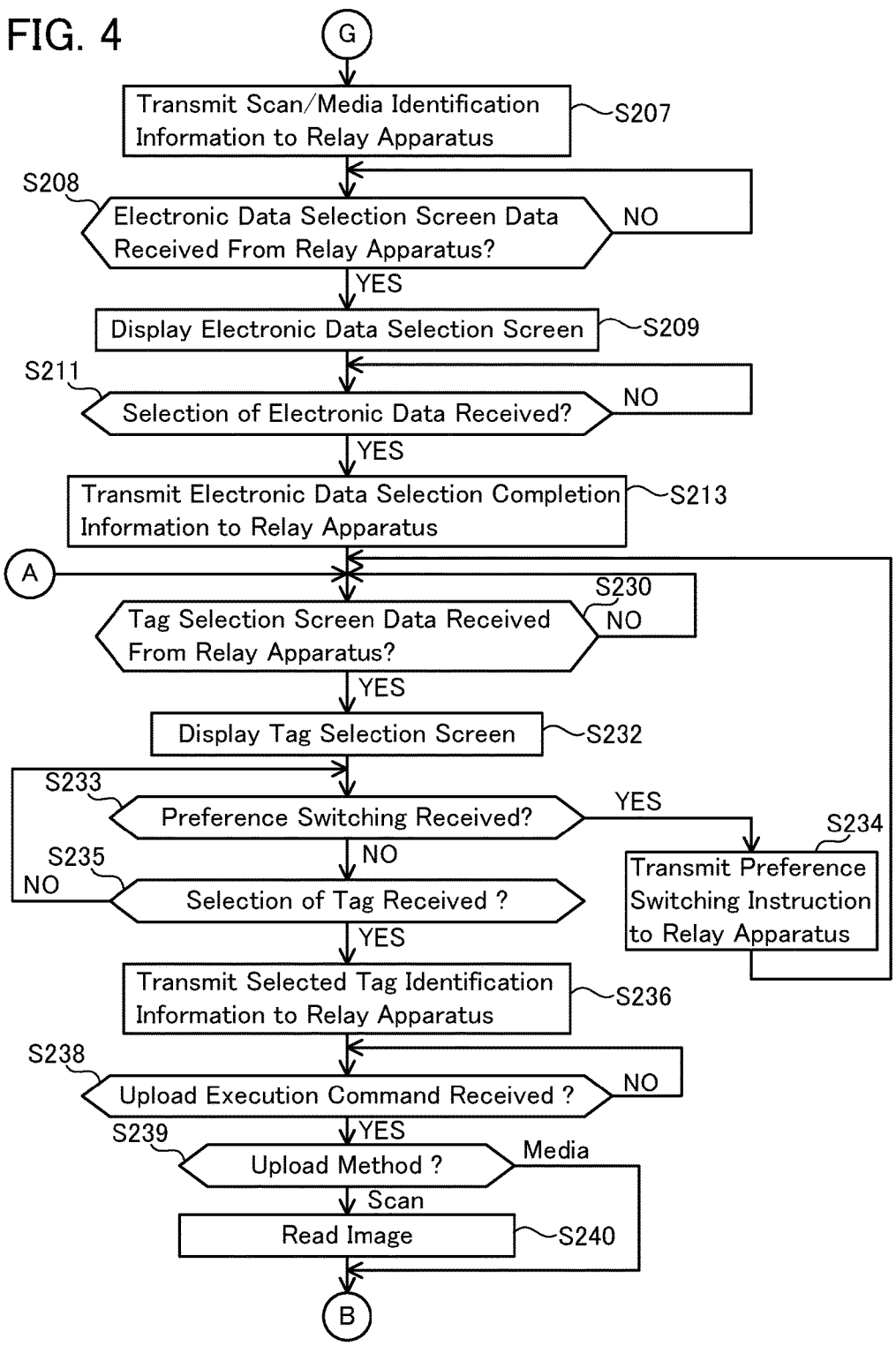
FIG. 4 is a flowchart for explaining the operation of the multi-function device 100.
Figure 5:
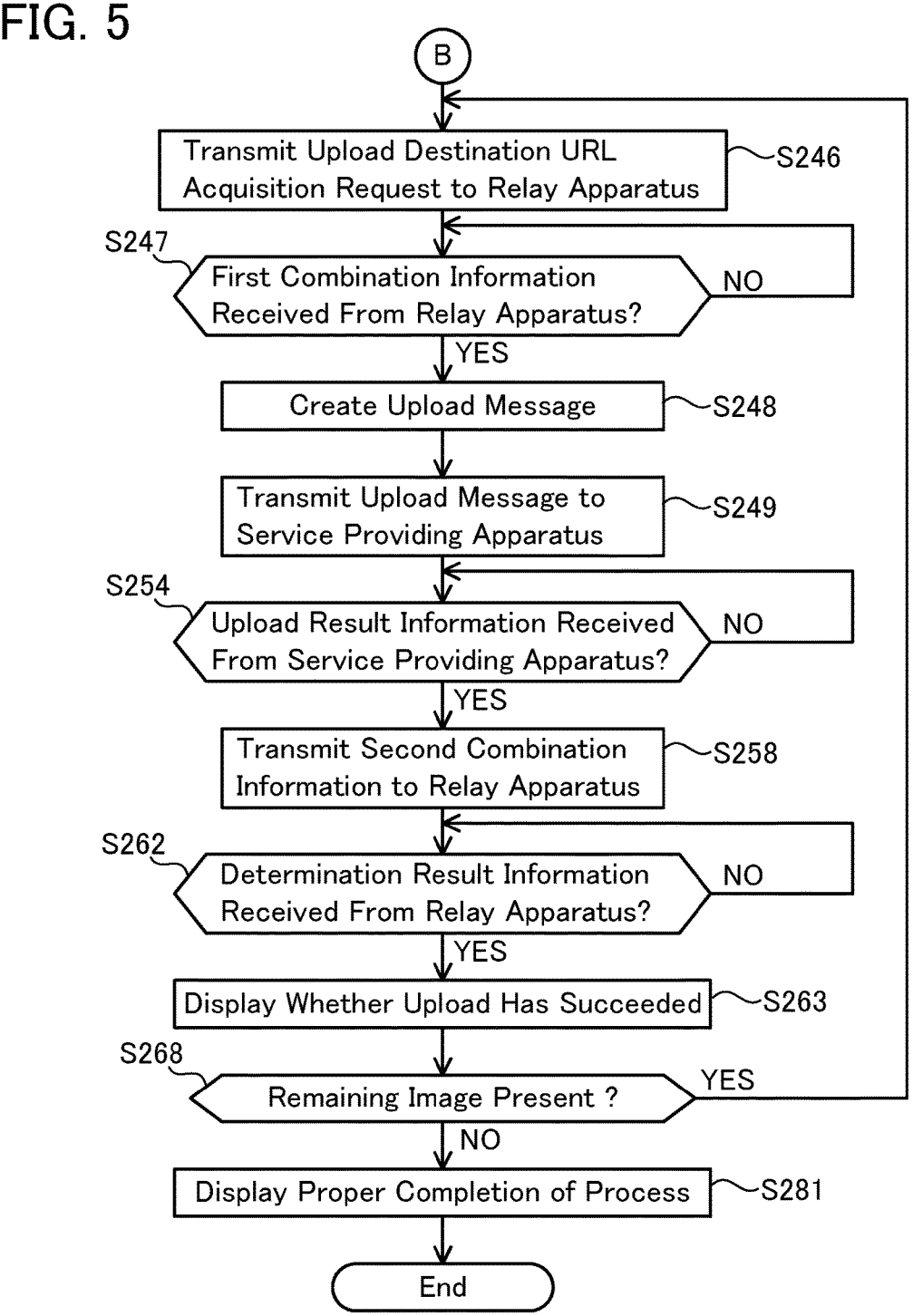
FIG. 5 is a flowchart for explaining the operation of the multi-function device 100.

An upload process performed by the multi-function device 100 will be described with reference to the flowcharts of FIGS. 3 to 5. The upload process may start, for example, when a user inputs an instruction to execute the upload process. In the present exemplary embodiment, a case where the user A selects the service A as an upload destination of electronic data will be described as an example.

Figure 15:
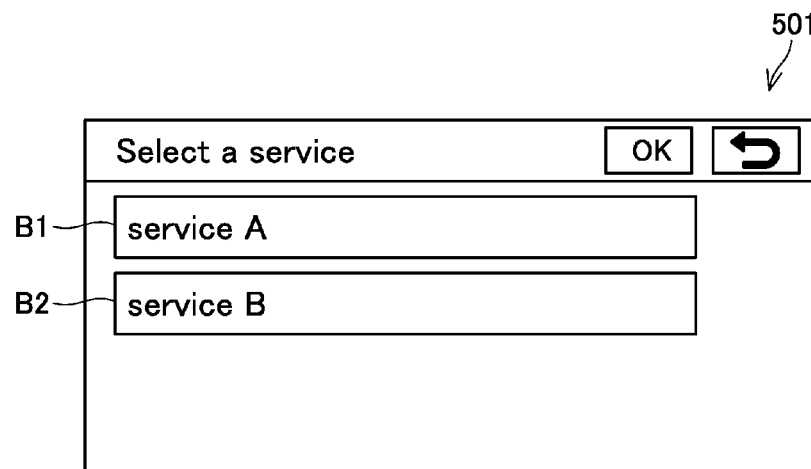
FIG. 15 shows an example of a display screen of a display unit.

When the upload process starts, in step S194, the control unit 120 displays a service selection screen on the display unit 150. FIG. 15 shows a service selection screen 501 used in a description example of the present exemplary embodiment. A button image B1 for selecting the service A and a button image B2 for selecting the service B are displayed in the service selection screen 501. Thus, the user A can select a desired service among the services A and B.

In step S195, the control unit 120 determines whether a selection of service by the user A has been received. When the selection is not received (step S195: NO), the flow returns to step S195. When the selection is received (step S195: YES), the flow proceeds to step S196.

In step S196, the control unit 120 determines whether a login to the selected service has succeeded. In the login process, for example, the operation unit 180 may receive the input of the user ID and password of the user A in order to log into the selected service. The input user ID and password may be authenticated on the service side, whereby the login to the selected service may succeed. When the login has not succeeded (S196: NO), the flow returns to step S196. When the login has succeeded (S196: YES), the flow proceeds to step S197. In step S197, the control unit 120 transmits service identification information for specifying the service selected by the user to the relay apparatus 200 and stores the service identification information in the RAM 123 of the control unit 120. The service identification information is information for identifying a service selected by the user of the multifunction device 100 among a plurality of services. Moreover, the service identification information includes a user ID and a password. In the present exemplary embodiment, since the case where the service A is selected by the user A, the service identification information for identifying the service A is transmitted to the relay apparatus 200. Moreover, the service identification information includes the user M and password of the user A.

In step S198, the control unit 120 determines whether scan/media selection screen data has been received from the relay apparatus 200. The scan/media selection screen data is data for displaying a scan/media selection screen on the display unit 150. The scan/media selection screen is a screen for allowing the user A to select any one of scan and media as an upload method. When the scan/media selection screen data has not been received (S198: NO), the flow returns to step S198. When the scan/media selection screen data has been received (S198: YES), the flow proceeds to step S200.

In step S200, the control unit 120 displays the scan/media selection screen on the display unit 150. Items "Scan" and "Media" are displayed on the scan/media selection screen as items for selecting an upload method. The item "Scan" is an item for allowing the scanner unit 170 to read an image printed on a sheet and uploading the electronic data of the image to a service. On the other hand, the item "Media" is an item for selecting desired electronic data among a plurality of electronic data stored in advance in the memory card 141 and uploading the selected electronic data to a service.

In step S202, that control unit 120 determines whether a method of uploading the electronic data has been selected by the user A. When "Scan" is selected as the upload method (S202: Scan), the flow proceeds to step S203. In step S203, the control unit 120 transmits scan/media identification information indicating that the upload method selected by the user A to the relay apparatus 200.

S204, the control 120 determines whether scan setting screen data has been received from the relay apparatus 200. The scan setting screen data is data for displaying a scan setting screen on the display unit 150. The scan setting screen is a screen for receiving the input of various scan settings such as a setting for reading a document set on the scanner unit 170 in color or monochrome and a setting for a resolution used for reading. Moreover, the scan setting screen is a screen for receiving a selection of a file type to be set for scanned electronic data. On the scan setting screen, a scan setting and a file type can be assigned to the plurality of individual documents. For example, when ten pages of document are set on the scanner unit 170, a scan setting for monochrome reading and a file type of "pdf" can be assigned to the first to fifth pages of the document. Moreover, a scan setting for color reading and a file type of "jpg" can be assigned to the sixth to tenth pages of the document. When the scan setting screen data has not been received (S204: NO), the flow returns to step S204, When the scan setting screen data has been received (S204: YES), the flow proceeds to step S206. In S206, the control unit 120 displays the scan setting screen on the display unit 150.

In step S228, the control unit 120 determines whether the input of the scan setting and the file type by the user A has been received. When the input has not been received (S228: NO), the flow returns to step S228. When the input has been received (S228: YES), the flow proceeds to step S229. In step S229, the control unit 120 transmits the scan setting information to the relay apparatus 200. The scan setting information is information that includes the setting content of the scan setting and the file type set to the electronic data generated by the scanning process. Moreover, when the scanned document has a plurality of pages, the scan setting information stores the setting content of the scan setting and the file type for each of the plurality of pages. After that, the flow proceeds to step S230.

On the other hand, when "Media" is selected in step S202 (S202: Media), the flow proceeds to step S207. In step S207, the control unit 120 transmits scan/media identification information indicating that the upload method selected by the user A is "Media" to the relay apparatus 200. In step S208, the control unit 120 determines whether electronic data selection screen data has been received from the relay apparatus 200. The electronic data selection screen data is data for displaying an electronic data selection screen on the display unit 150. The electronic data selection screen is a screen for allowing the user A to select desired electronic data among the plurality of electronic data stored in the memory card 141. When the electronic data selection screen data has not been received (S208: NO), the flow returns to step S208. When the electronic data selection screen data has been received (S208: YES), the flow proceeds to S209. In step S209, the control unit 120 displays the electronic data selection screen data on the display unit 150.

In step S211, the control unit 120 determines whether the selection of electronic data to be uploaded to the service A has been received via the operation unit 180. When the selection of the electronic data has not been received (S211: NO), the flow returns to step S211. When the selection of the electronic data has been received (S211: YES), the flow proceeds to step S213. In step S213, the control unit 120 transmits electronic data selection completion information to the relay apparatus 200. The electronic data selection completion information is information representing that the selection of the electronic data by the user A has been completed. The electronic data selection completion information includes the file name of the electronic data selected by the user A. Since the file name includes an extension, it is possible to deliver the file type of the electronic data selected by the user A to the relay apparatus 200. After that, the flow proceeds to step S230.

Figure 16:
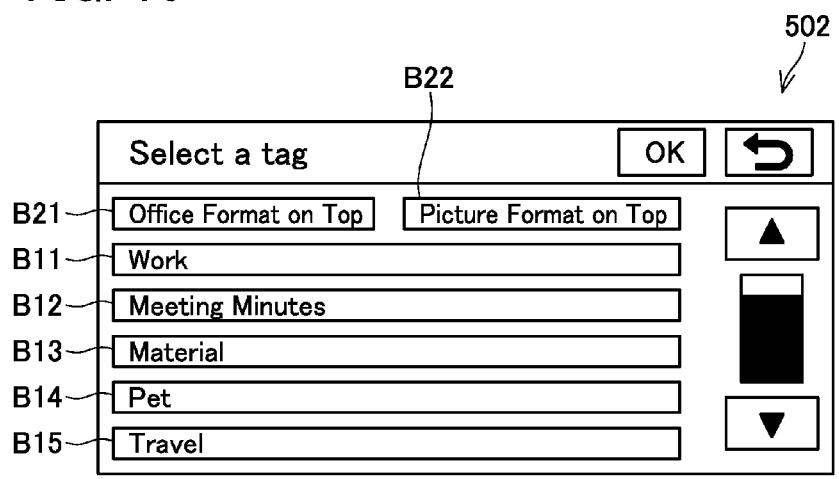
FIG. 16 shows an example of a display screen of a display unit.

In step S230, the control unit 120 determines whether tag selection screen data has been received from the relay apparatus 200. The tag selection screen data is data for displaying a tag selection screen on the display unit 150. The tag selection screen is a screen for receiving the selection of tag data to be associated with electronic data that is to be uploaded to the service. A list of candidate tags may be displayed on the tag selection screen. When the tag selection screen data has not been received (S230: NO), the flow returns to S230. When the tag selection screen data has been received (S230: YES), the flow proceeds to step S232. In step S232, the control unit 120 displays the tag selection screen on the display unit 150. FIG. 16 shows a tag selection screen 502 used in a description example of the present exemplary embodiment. Button images B11 to B15 for selecting tags and button images B21 and B22 for switching a preferential order for rearranging the display order of tags are displayed in the tag selection screen 502.

In step S233, the control unit 120 determines whether preference switching has been received. Specifically, it is determined whether the button image B21 or B22 has been touched. When the preference switching has not been received (S233: NO), the flow proceeds to step S235. When the preference switching has been received (S233: YES), the flow proceeds to step S234. In step S234, the control unit 120 transmits a preference switching instruction to the relay apparatus 200. When the image B21 is touched, a preference switching instruction indicating that the "Office" file format is displayed preferentially is transmitted. Moreover, when the button image B22 is touched, a preferential order switching instruction indicating that the "Picture" file format is displayed preferentially is transmitted. After that, the flow returns to step S230.

In step S235, the control unit 120 determines whether the selection of selected tag data has been received. A method of receiving the selection of selected tag data may be a method in which a tag assigned to a button image touched by the user A on the tag selection screen 502 is used as selected tag data selected by the user A. Moreover, the selection of a plurality of selected tag data may be received. When the selection of the selected tag data has not been received (S235: NO), the flow returns to step S233. On the other hand, when the selection of the selected tag data has been received (S235: YES), the flow proceeds to step S236 after acquiring the selected tag data.

In step S236, the control unit 120 transmits selected tag identification information to the relay apparatus 200. The selected tag identification information is information for identifying the selected tag data selected in step S235. For example, the selected tag identification information may be the selected tag data itself and may be an identification ID of the selected tag data.

In step S238, the control unit 120 determines whether an upload execution command has been received from the relay apparatus 200. The upload execution command is a command for allowing the multi-function device 100 to execute a process of uploading electronic data to the service providing apparatus 300A. When the upload execution command has not been received (S238: NO), the flow returns to step S238. When the upload execution command has been received (S238: YES), the flow proceeds to step S239.

In step S239, the control unit 120 determines which upload method has been selected in step S202. When "Media" has been selected (S239: Media), the flow proceeds to step S246. When "Scan" has been selected (S239: Scan), the flow proceeds to step S240. In step S240, an image is read. Specifically, when the user A sets a sheet on which a predetermined image is recorded on the scanner unit 170 and presses a read start button of the operation unit 180, the control unit 120 allows the scanner unit 170 to read the image recorded on the sheet to create electronic data from the read image data. The scanner unit 170 reads the image based on the scan setting input in step S228. After that, the flow proceeds to step S246.

In step S246, the control unit 120 transmits an upload destination URL acquisition request to the relay apparatus 200. The upload destination URL acquisition request includes service identification information and user identification information. The service identification information may be the service identification information stored in the RAM 123 in step S197. The user identification information may be the user identification information stored in the information storage unit 130.

In step S247, the control unit 120 determines whether first combination information, the upload destination URL, and the template for the upload message have been received from the relay apparatus 200. The first combination information is information that combines a result information destination address and selected tag identification information. The result information destination address is information for designating a destination when transmitting determination result information created by the relay apparatus 200 in step S466 to the multi-function device 100 in step S476. When the first combination information and the like have not been received (S247: NO), the flow returns to step S247. When the first combination information and the like have been received (S247: YES), the flow proceeds to step S248.

In step S248, the control unit 120 an upload based on the received template, the received upload destination URL, and the electronic data created in step S240 or the electronic data selected in step S211. Specifically, the multi-function device 100 stores various types of information such as binary data of electronic data, an upload destination URL, and a data size of the electronic data at a predetermined position of the template received from the relay apparatus 200. Due to this, it is possible to create the upload message corresponding to the service A. In step S249, the control unit 120 transmits the upload to the providing apparatus 300A of the service A.

In step S254, the control unit 120 determines whether upload result information and electronic data identification information have been received from the service providing apparatus 300A. The upload result information is information representing whether electronic data has been properly uploaded to the service providing apparatus 300A. The electronic data identification information is information for identifying electronic data that has been properly uploaded to the service providing apparatus 300A. An example of the electronic data identification information is a file ID. When the upload result information and the like have not been received (S254: NO), the flow returns to step S254. When the upload result information and the like have been received (S254: YES), the flow proceeds to step S256.

In step S258, the control unit 120 generates second combination information and transmits the same to the relay apparatus 200. The second combination information is information that combines upload notification information and the upload result information in addition to the first combination information. The upload notification information is information that includes tagging request information and electronic data identification information. In this manner, since the second combination information has a layered structure that includes various types of information, it is possible to communicate various types of information such as the upload result information and the tagging request information with one communication request.

Moreover, the second combination information includes the upload result information in the form of being received from the service providing apparatus 300A. This is because the content of the upload result information is different from service to service, and thus, the multi-function device 100 cannot decode the upload result information. This is to transmit the upload result information to the relay apparatus 200 to allow the relay apparatus 200 to decode the upload result information.

In step S262, the control unit 120 determines whether determination result information and tagging result information have been received from the relay apparatus 200. The determination result information is information representing whether electronic data could be properly uploaded. The determination result information is information that is converted by the relay apparatus 200 so that the multi-function device 100 can decode the information. The tagging result information is information representing whether the tag data is properly associated with the uploaded electronic data. When the determination result information and the tagging result information have not been received (S262: NO), the flow returns to step S262. When the determination result information and the tagging result information have been received (S262: YES), the flow proceeds to step S263. In step S263, the control unit 120 displays on the display unit 150 whether the upload has succeeded based on the determination result information and the tagging result information. Due to this, the user A can check whether the upload has succeeded. Moreover, when the upload has succeeded, the user A can check where the uploaded electronic data is stored.

In the control unit 120 determines whether there is another image to be read by the scanner unit 170 and whether there is another electronic data to be uploaded within the memory card 141. When there is another electronic data related to the image read by the scanner unit 170 or when there is another electronic data to be uploaded within the memory card 141 (S268: YES), the flow returns to step S246. On the other hand, when there is no image to be read by the seamier unit 170 or when there is no electronic data to be uploaded within the memory card 141 (S268: NO), the flow proceeds to step S281. In step S281, the control unit 120 displays a message indicating a proper completion of the process on the display unit 150, and the process ends.

<Operation of Relay Apparatus 200>

Figure 6:
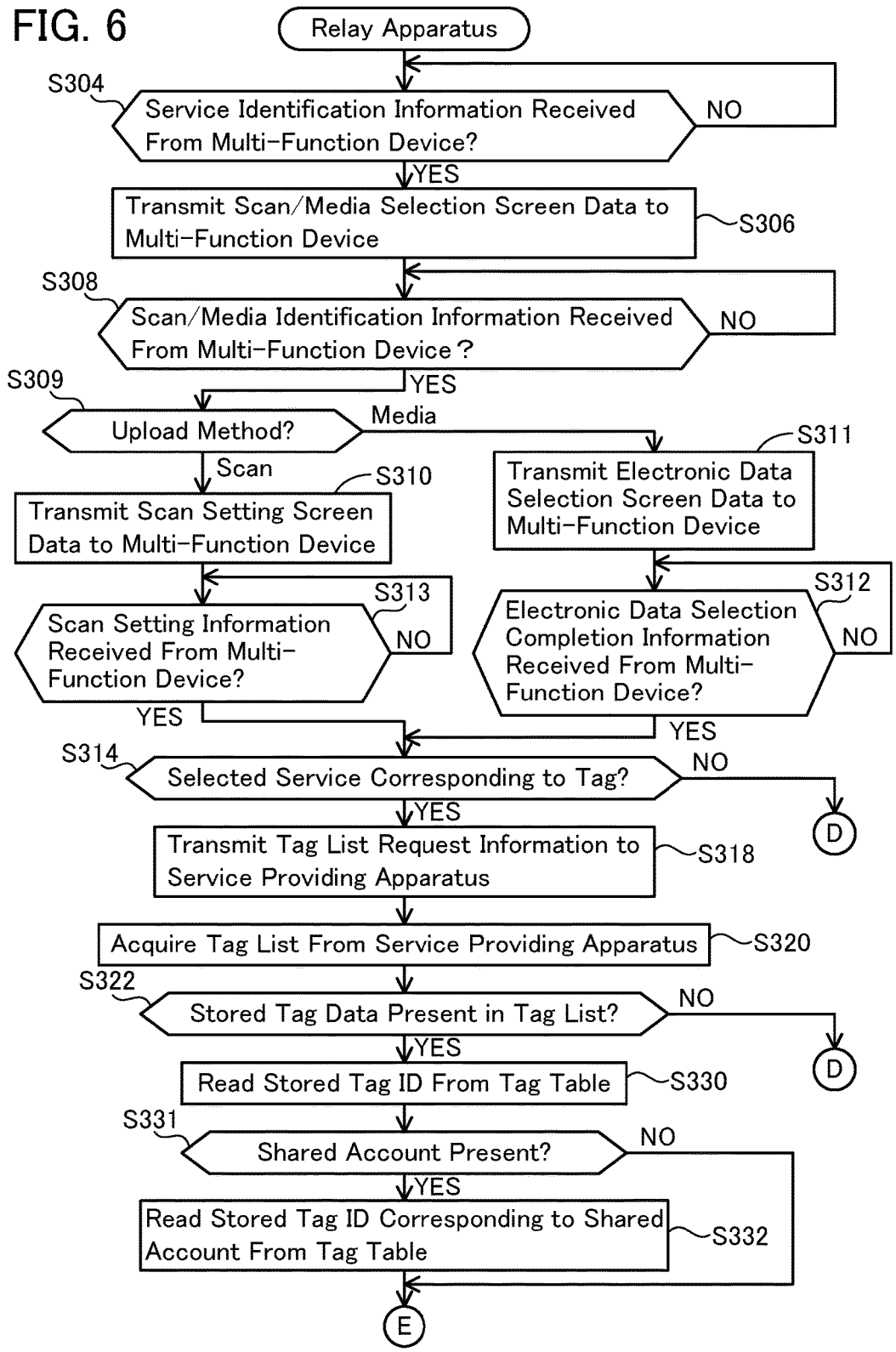
FIG. 6 is a flowchart for explaining the operation of a relay apparatus 200.
Figure 7:
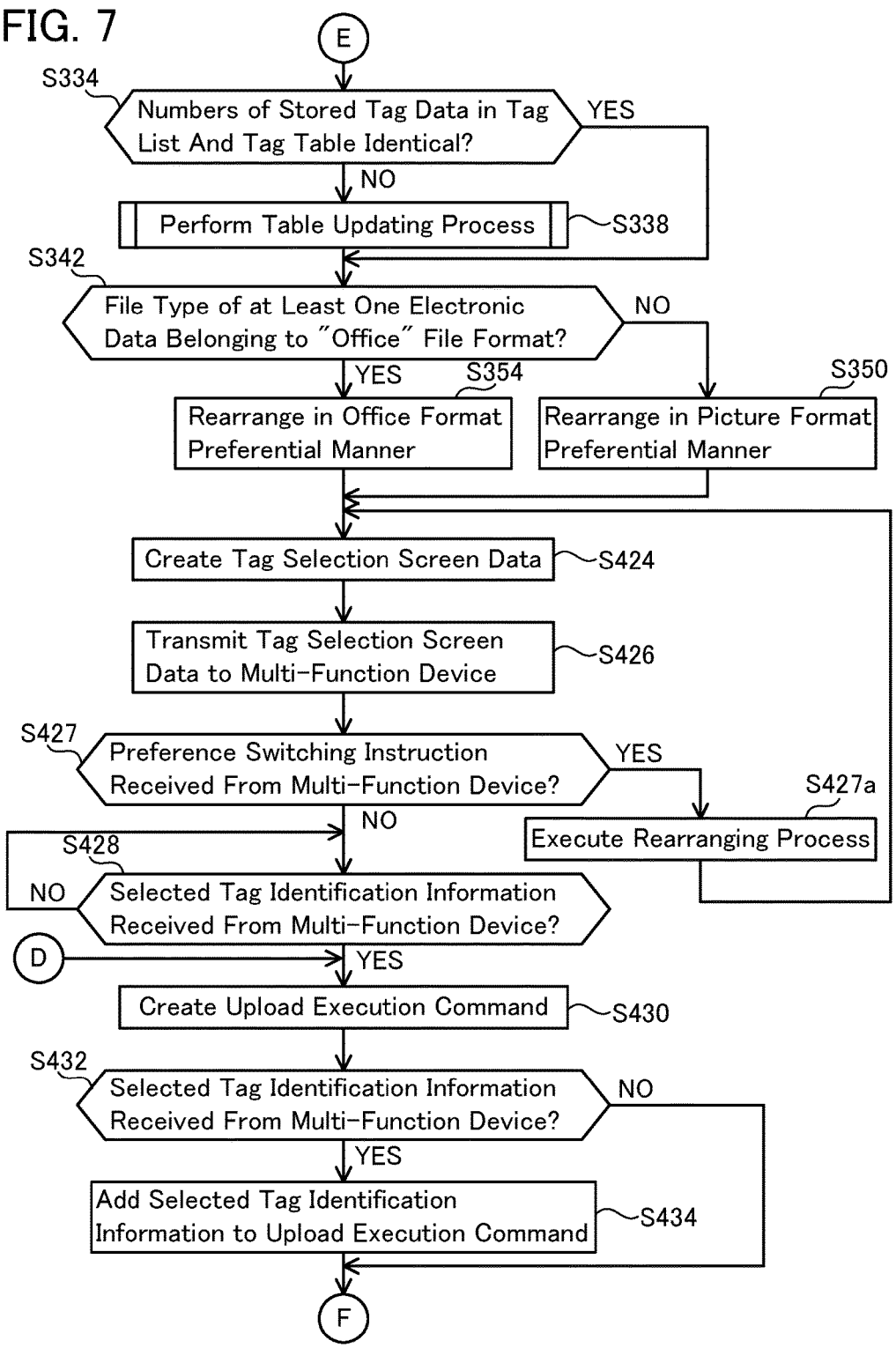
FIG. 7 is a flowchart for explaining the operation of the relay apparatus 200.
Figure 8:
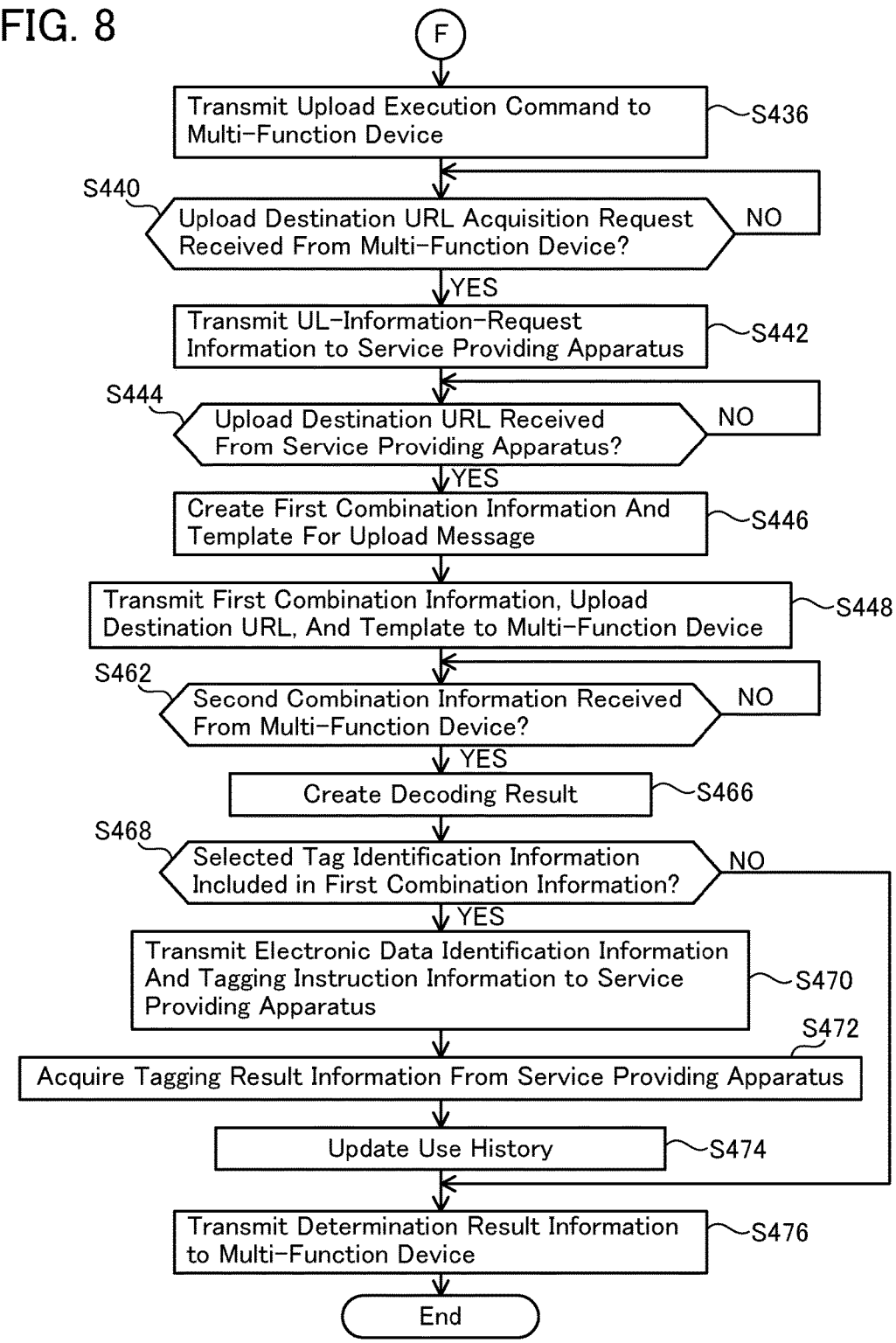
FIG. 8 is a flowchart for explaining the operation of the relay apparatus 200.

A detailed operation of the relay apparatus 200 will be described with reference to FIGS. 6 to 8. When the relay program 251 stored in the information storage unit 230 is executed, the control unit 220 of the relay apparatus 200 starts the process shown in FIGS. 6 to 8 according to various programs stored in the information storage unit 230. In the present exemplary embodiment, the process when the user A selects the service A as an upload destination of electronic data will be described as an example.

In step S304, the control unit 220 determines whether service identification information has been received from the multi-function device 100. When the service identification information has not been received (S304: NO), the flow returns to step S304. When the service identification information has been received (S304: YES), the flow proceeds to step S306. In step S306, the control unit 220 generates scan/media selection screen data and transmits the same to the multi-function device 100.

In step S308, the control unit 220 determines whether scan/media identification information has been received from the multi-function device 100. When the scan/media identification information has not been received (S308: NO), the flow returns to step S308. When the scan/media identification information has been received (S308: YES), the flow proceeds to step S309.

In step S309, the control unit 220 determines the upload method selected by the user based on the scan/media identification information. When the upload method is "Scan" (S309: Scan), the flow proceeds to step S310, and the control unit 220 generates scan setting screen data and transmits the same to the multi-function device 100. In step S313, the control unit 220 determines whether scan setting information has been received from the multi-function device 100. When the scan setting information has not been received (S313: NO), the flow returns to step S313. When the scan setting information has been received (S313: YES), the flow proceeds to step S314.

On the other hand, when it is determined in step S309 that the upload method is "Media" (S309: Media), the flow proceeds to step S311 and the control unit 220 generates electronic data selection screen data and transmits the same to the multi-function device 100. In step S312, the control unit 220 determines whether electronic data selection completion information has been received from the multi-function device 100. When the electronic data selection completion information has not been received (S312: NO), the flow returns to step S312. When the electronic data selection completion information has been received (S312: YES), the flow proceeds to step S314.

In step S314, the control unit 220 determines whether the selected service supports a tag. This determination may be performed by storing correspondence between tags and services in advance in the information storage unit 230. When the service does not correspond to the tag (S314: NO), the flow proceeds to step S430. When the service corresponds to the tag (S314: YES), the flow proceeds to step S318.

In step S318, the control unit 220 transmits tag list request information to the service providing apparatus 300A of the service A selected by the user A. The tag list request information is information for requesting a tag list to the service providing apparatus 300A. The tag list is a list of stored tag data associated with each of all the stored electronic data that the user A has stored in the service providing apparatus 300A. The stored tag data includes selected tag data selected by the user A in the past. The tag list request information is information that has specifications unique to the service A. Thus, by creating and transmitting the tag list request information using the tag list request program 233 stored in the information storage unit 230, it is possible to match the tag list request information with the specifications of the service A.

In step S320, the control unit 220 acquires a tag list for the user A from the service providing apparatus 300A. In step S322, the control unit 220 determines whether stored tag data in list. For example, when the volume of the tag list is smaller than a predetermined volume, it may be determined that the stored tag data is not present. When the stored tag data is not present (S322: NO), the flow proceeds to step S430. When the stored tag data is present (S322: YES), the flow proceeds to step S330.

In step S330, the control unit 220 specifies a read area corresponding the user operating the multi-function device 100 and the service selected by the user, in the tag table 280 stored in the information storage unit 230. The user (that is, the user A) operating the multifunction device 100 can be specified based on the user ID included in the service identification information received in step S304. Moreover, the service selected by the user (that is, the service A) can be specified based on information for identifying the service included in the service identification information. Moreover, the stored tag ID 803, the tag content 804, the file type 805, the file format 806, and the like are read from the specified read area.

In step S331, the control unit 220 determines whether a shared account corresponding to the selected service is present. Specifically, it is determined whether the service name 802 of "Service A" is registered in the "Shared Account ID" field of the user ID 800 in the tag table 280. When the shared account is not present (S331: NO), the flow proceeds to step S334. When the shared account is present (S331: YES), the flow proceeds to step S332. In step S332, the control unit 220 specifies the read area identified by the shared account on the tag table 280. Moreover, the stored tag ID 803, the tag content 804, the file type 805, the file format 806, and the like are read from the specified read area.

In step S334, the control unit 220 determines whether the number of stored tag data stored in the tag list is identical to the number of stored tag data read from the tag table 280 in step S330. When both numbers are identical (S334: YES), the flow proceeds to step S342. On the other hand, when both numbers are not identical (S334: NO), the flow proceeds to step S338, determining that it is necessary to update the tag table 280. In step S338, the control unit 220 executes a table updating process. The content of the table updating process will be described later.

In step the control unit 220 determines whether the file type of at least one electronic data of the plurality of uploaded electronic data belongs to the "Office" file format. The determination method will be described in detail. When it is determined in step S312 that the scan setting information has been received from the multifunction device 100, the file type stored in the scan setting information is read. When the document includes a plurality of pages, the file types of the plurality of pages are read. Moreover, it is determined whether at least one of the read file types belongs to the "Office" file format 806. Specifically, it is determined whether the file type is any one of "doc," "xls," and "pdf." On the other hand, when it is determined in step S312 that the electronic data selection completion information has been received from the multi-function device 100, the extension is extracted from the file name of the electronic data included in the electronic data selection completion information. When there is a plurality of selected electronic data, the extensions are extracted from all the plurality of electronic data. Moreover, it is determined whether at least one of the extracted extensions is "doc," "xls," and When the file type of at least one electronic data is the "Office" file format (S342: YES), the flow proceeds to step S354, In step S354, the control unit 220 rearranges the stored tag ID 803 and the tag content 804 read in steps S330 and S332 so that the office format is displayed preferentially. This will be described in detail. The control unit 220 extracts a related stored tag ID from the read area of the tag table 280. The related stored tag ID is a stored tag ID associated with the same file type as the file type (for example, "doc") of the uploaded electronic data. Moreover, the display preferential order of the extracted stored tag ID is set to the highest so that the related stored tag ID is displayed preferentially on the display unit 150 of the multi-function device 100. The display preferential order is information that determines the order of displaying the tag content 804 on the display unit 150 of the multi-function device 100. The tag data having the higher display preferential order is displayed preceding other tag data on the display unit 150. When there is a plurality of related stored tag IDs, the related stored tag ID of which the last used date 807 is newer has a higher display preferential order.

Subsequently, the control unit 220 extracts, a stored tag ID that is not associated with the same file type as the file type (for example, "doc") of the send file but is associated with a file type (for example, "xls") that belongs to the "Office" file format, from the read area. Moreover, the display preferential order of the extracted stored tag ID is set as a preferential order that is the next lower than the display preferential order of the related stored tag ID.

Finally, the control unit 220 extracts, a stored tag ID that is associated with the file type (for example, "jpg" or "png") that does not belong to the "Office" file format, from the read area. Moreover, the display preferential order of the extracted stored tag ID is set as the lowest preferential order.

On the other hand, when it is determined in step S342 that none of the electronic data has the "Office" file format (S342: NO), the flow proceeds to step S350. In step S350, the control unit 220 rearranges the stored tag ID 803 and the tag content 804 read in steps S330 and S332 so that the picture format is displayed preferentially. Specifically, the control unit 220 extracts the stored tag ID 803 associated with the file type (for example, "jpg") that belongs to the "Picture" file format from the read area of the tag table 280 and sets the display preferential order thereof to the highest value. Moreover, the control unit 220 extracts the stored tag ID associated with the file type (for example, "xls") that belongs to the "Office" file format from the read area and sets the display preferential order thereof to the lowest value.

In step S424, the control unit 220 creates tag selection screen data based on the stored tag ID 803 and the tag content 804 that are rearranged. The tag selection screen data is data for displaying the tag selection screen on the display unit 150 of the multi-function device 100. The tag selection screen data includes a plurality of selected tags included in the tag list. In step S426, the control unit 220 transmits the tag selection screen data to the multi-function device 100.

In step S427, the control unit 220 determines whether a preferential order switching instruction has been received from the multi-function device 100. When the preferential order switching instruction has not been received (S427: NO), the flow proceeds to step S428. When the preferential order switching instruction has been received (S427: YES), the flow proceeds to step S427a. In step S427a, the control unit 220 determines whether the received preferential order switching instruction gives higher preference to the "Office" file format or the "Picture" file format. When the "Office" file format is given the higher preference, the stored tag ID 803 and the tag content 804 read in steps S330 and S332 are rearranged so that the office format is displayed preferentially. After that, the flow returns to step S424. Since the content of the process of rearranging the data so that the office format is displayed preferentially is the same as step S354, the description thereof will not be provided. On the other hand, when the "Picture" file format is given the higher preference, the stored tag ID 803 and the tag content 804 read in steps S330 and S332 are rearranged so that the picture format is displayed preferentially. After that, the flow returns to step S424. Since the content of the process of rearranging the data so that the picture format is displayed preferentially is the same as step S350, the description thereof will not be provided.

In step S428, the control unit 220 determines whether the selected tag identification information has been received from the multi-function device 100. When the selected tag identification information has not been received (S428: NO), the flow returns to step S428. When the selected tag identification information has been received (S428: YES), the flow proceeds to step S430. In step S430, the control unit 220 generates an upload execution command.

In step S432, the control unit 220 determines whether the selected tag identification information has been received from the multi-function device 100 in step S428. When the selected tag identification information has not been received (S432: NO), the flow proceeds to step S436. When the selected tag identification information has been received (S432: YES), the flow proceeds to step S434. In step S434, the control unit 220 adds the selected tag identification information to the upload execution command. In step S436, the control unit 220 transmits the upload execution command to the multi-function device In step S440, the control unit 220 determines whether an upload destination URL acquisition request has been received from the multi-function device 100. When the upload destination acquisition request has not been received (S440: NO), the flow returns to step S440. When the upload destination acquisition request has been received (S440: YES), the flow proceeds to step S442.

In step S442, the control unit 220 creates a UL-information-request information and transmits the same to the service providing apparatus 300A, The UL-information-request information is information for requesting, to the service A, an upload destination URL which is information necessary for performing an upload to the service A. The UL-information-request information is information that has specifications unique to the service A. Thus, by creating and receiving the UL-information-request information using the URL acquisition program 232 stored in the information storage unit 230, it is possible to match the UL-information-request information with the specifications of the service A. The UL-information-request information created in this case is an HTTP message that uses an open API of the service A.

The specifications of the UL-information-request information will be described. The information included in the UL-information-request information may be different from service to service. For example, when information for specifying the storage location of the electronic data of a service, such as an album ID, is required to allow the service to specify the upload destination URL, the UL-information-request information includes an album ID of an album that the user uses. Moreover, when information for specifying the storage location of the electronic data of a service, such as a folder name, is required to allow the service to specify the upload destination URL, the UL-information-request information includes a folder name that the user uses. The auxiliary information such as an album ID or a folder name that the user uses may be stored in advance in the information storage unit 230.

In S444, the control unit 220 determines whether the upload destination URL has been received from the service providing apparatus 300A. When the upload destination URL has not been received (S444: NO), the flow returns to step S444. When the upload destination URL has been received (S444: YES), the flow proceeds to step S446. In step S446, the control unit 220 creates the first combination information and a template for the upload message.

The specifications of the upload message may be unique to the service A. Thus, by creating the template for the upload message using the template creating program 234 stored in the information storage unit 230, it is possible to match the template for the upload message with the specifications of the service A. The upload message is an HTTP request message, for example. However, the information included in a header and the type and the number of information included in a request body are different from service to service. For example, some services may require information such as a file name of electronic data to be included in the request body in addition to the binary data of the electronic data. Other services may require binary data only to be included in the electronic data and require information such as a file name to be included in a header.

In step S448, the control unit 220 transmits the first combination information, the upload destination URL, and the template for the upload message to the multi-function device 100.

In step S462, the control unit 220 determines whether second combination information has been received from the multi-function device 100. When the second combination information has not been received (S462: NO), the flow returns to step S462. When the second combination information has been received (S462: YES), the flow proceeds to step S466. In step S466, the control unit 220 decodes the upload result information included in the second combination information and creates a decoding result. Since the upload result information is information that is transmitted from the service providing apparatus 300A to the multi-function device 100 via the relay apparatus 200, the information has specifications unique to the service A. Thus, it is possible to decode the upload result information using the decoding program 235 stored in the information storage unit 230. The decoding result is a message of such a format that can be decoded by the multi-function device 100. The decoding result includes an upload result that is included in the decoded upload result information.

In step S468, the control unit 220 determines whether selected tag identification information is included in the first combination information that is included in the second combination information received in step S462. When the selected tag identification information is not included (S468: NO), the flow proceeds to step S476, determining that the selected tag data is not selected by the user. On the other hand, when the selected tag identification information is included (S468: YES), the flow proceeds step S470, determining that the selected tag data is selected by the user.

In step S470, the control unit 220 transmits electronic data identification information and tagging instruction information to the service providing apparatus 300A. The tagging instruction information is information for requesting the service providing apparatus 300A to assign the selected tag data identified by the selected tag identification information to the electronic data identified by the service A based on the electronic data identification information. Moreover, the tagging instruction information is information that has specifications unique to the service A. Thus, by creating and transmitting the tagging instruction information using the tagging instruction program 231 stored in the information storage unit 230, it is possible to match the tagging instruction information with the specifications of the service A.

In step S472, the control unit 220 acquires tagging result information from the service providing apparatus 300A. In step S474, the control unit 220 updates the use history 808 of the tag table 280. In step S476, the control unit 220 transmits the determination result information and the tagging result information to the multi-function device 100. After that, the flow ends.

Figure 9:
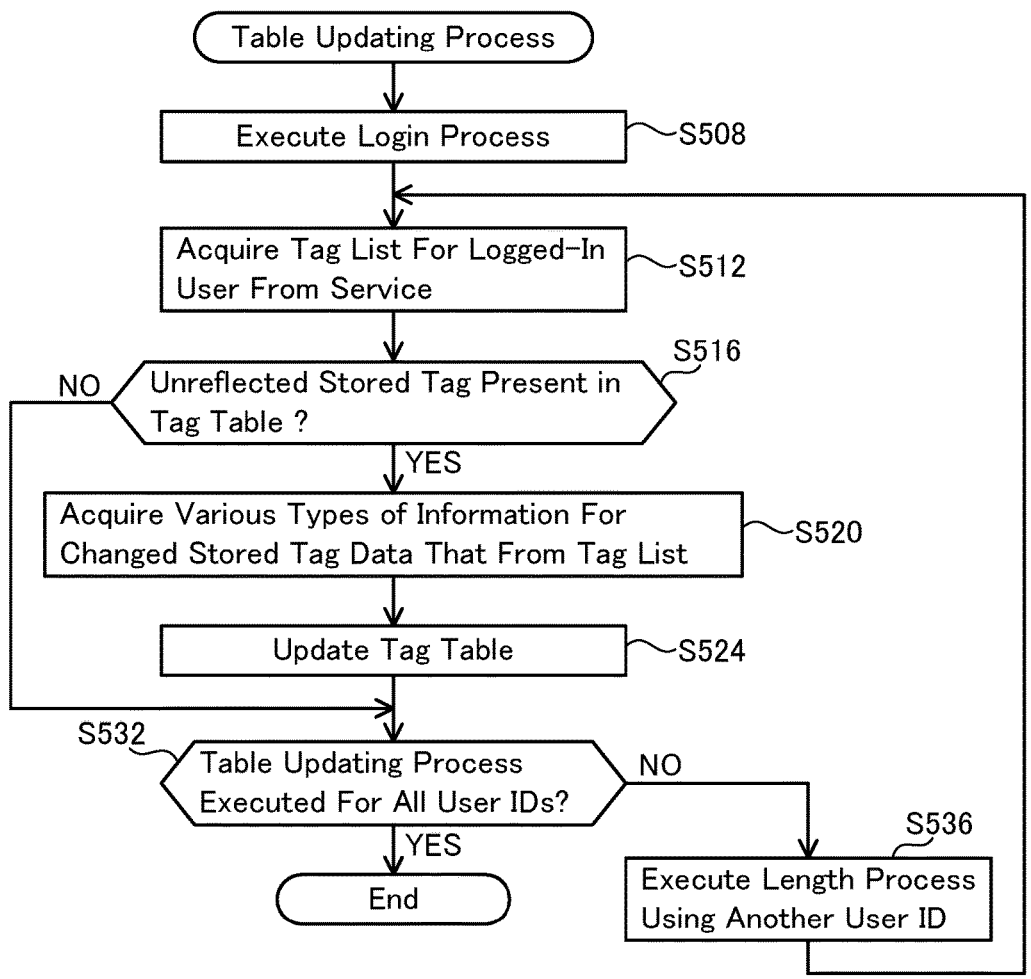
FIG. 9 is a flowchart for explaining a table updating process.

The table updating process of updating the tag table 280 will be described with reference to the flowchart of FIG. 9. The table updating process may be performed in step S338 and may be performed periodically. The frequency when the process is executed periodically may be set in advance by an administrator of the relay apparatus 200.

In step S508, the control unit 220 executes a login process. In the login process, one user ID 800 selected from the tag table 280 and the password 801 correlated with the selected user ID 800 are used. Moreover, the user ID 800 and the password 801 are authenticated on the service side, whereby the login to the selected service succeeds. When the table updating process is performed in the step S338, since the login to the service has been completed in step S196, the login process of step S508 may be omitted. In step S512, the control unit 220 acquires a tag list for the logged-in user from the service.

In step S516, the control unit 220 determines whether there is a stored tag data that has not been reflected in the tag table 280 in the acquired tag list. Specifically, the control unit 220 detects the latest last used date 807 in the last used date 807 for the logged-in user of the tag table 280. Moreover, it is determined whether stored tag data having a newer update date than the latest last used date 807 is included in the tag list. When the stored tag data that has not been reflected is present (S516: NO), the flow proceeds to step S532. When the stored tag data that has not been reflected is present (S516: YES), the flow proceeds to step S520. In step S520, the control unit 220 acquires various types of information (for example, the stored tag ID 803, the stored tag content 804, the last used date 807, and the like) from the tag list with respect to the stored tag data that has been changed after the latest last used date 807. In step S524, the control unit 220 updates the tag table 280. Specifically, the control unit 220 stores various types of information read in step S520 in the tag table 280.

In step S532, the control unit 220 determines whether the table updating process has been executed for all user IDs 800 stored in the tag table 280. When the table updating process has not been executed for all user IDs (S532: NO), the flow proceeds to step S536. In step S536, the control unit 220 selects another user ID 800 from the tag table 280. Moreover, the login process is executed using the selected one user ID 800 and the password 801 correlated with the selected user ID 800. After that, the flow returns to step S512. On the other hand, when the table updating process has been executed for all user IDs 800 (S532: YES), the flow ends.

<Operation of Service Cooperation System 10>

An example of the operation of the service cooperation system 10 will be described with reference to the sequence diagrams of FIGS, 11 and 12. In this description example, the flow when the user A uploads electronic data of an image read by the scanner unit 170 using the multi-function device 100 will be described. Moreover, the flow when the service A is selected as the upload destination of the electronic data will be described as an example. Further, a case where two pages of document are scanned, the first page is set to the "doc" file type, and the second page is set to the "jpg" file type will be described as an example. Furthermore, a case where the electronic data shown in FIG. 13 has been uploaded by the user A to the service .A will be described as an example. Furthermore, a case where the tag table 280 of FIG. 10 is stored in the information storage unit 230 will be described as an example.

When the user A operates the operation unit 180 of the multi-function device 100 to select the service A as a service to which the electronic data is to be uploaded (S195: YES), the multi-function device 100 logs into the service A (S196). The multi-function device 100 transmits service identification information to the relay apparatus 200 (S197). Upon receiving the service identification information from the multi-function device 100 (S304: YES), the relay apparatus 200 generates scan/media selection screen data and transmits the same to the multi-function device 100 (S306). Upon receiving the scan/media selection screen data from the relay apparatus 200 (S198: YES), the multi-function device 100 displays a scan/media selection screen on the display unit 150 (S200).

When the user A selects "Scan" as an upload method (S202: Scan), the multi-function device 100 transmits scan/media identification information to the relay apparatus 200 indicating that the selected upload method is "Scan" (S203). Upon receiving the scan/media identification information from the multi-function device 100 (S308: YES), the relay apparatus 200 determines that the upload method is "Scan" (S309: Scan), generates scan. setting screen data, and transmits the same to the multi-function device 100 (S310). Upon receiving the scan setting screen data from the relay apparatus 200 (S204: YES), the multi-function device 100 displays the scan setting screen on the display unit 150 (S206).

When the user A inputs scan settings and sets the first page to the "doc" file type and the second page to the "jpg" file type (S228: YES), the multi-function device 100 transmits the scan setting information to the relay apparatus 200 (S229). Upon receiving the scan setting information from the multi-function device 100 (S312: YES), the relay apparatus 200 transmits tag list request information to the service providing apparatus 300A (S318). The relay apparatus 200 acquires a tag list from the service providing apparatus 300A (S320). As shown in FIG. 13, the acquired tag list includes four items of tag data 604 of " Meeting Minutes," "Material," "Travel," and "Pet" (S322: YES).

The relay apparatus 200 specifies the read area R31 (see FIG. 10) corresponding to the user A and the service A on the tag table 280 (S330). Moreover, the relay apparatus 200 reads the stored tag ID 803, the tag content 804, the file type 805, the file format 806, and the like from the read area R31. The relay apparatus 200 determines that a shared account corresponding to the service A is present (S331: YES) (see Area R32). Moreover, the relay apparatus 200 specifies the read area R33 (see FIG. 10) identified by the shared account on the tag table 280 (S332). The relay apparatus 200 reads the stored tag ID 803, the tag content 804, the file type 805, the file format 806, and the like from the read area R33.

Since the number (4) of stored tag data stored in the tag list is identical to the number (4) of stored tag IDs 803 stored in the read area R31, it is determined that it is not necessary to update the tag table 280 (S334: YES), The relay apparatus 200 determines that one of the file types stored in the scan setting information (S312) received from the multi-function device 100 is "doc" and belongs to the "Office" file format 806 (S342: YES).

The relay apparatus 200 rearranges the stored tag ID 803 and the tag content 804 read from the read areas R31 and R33 so that the office format is displayed preferentially (S354). This will be described in detail. The display preferential order of the tag content 804 of "Work" (see Area R34) which is associated with the same file type as the file type "doc" of the uploaded electronic data and of which the last used date 807 is the newest is the highest. The display preferential order of the tag content 804 of "Meeting Minutes" (see Area R21) which is associated with the same file type as the file type "doc" of the uploaded electronic data and of which the last used date 807 is the second newest is the second highest. The display preferential order of the tag content 804 of "Material" (see Area R35) which is not associated with the same file type as the file type "doc" of the uploaded electronic data but is associated with the file type "pdf" that belongs to the "Office" file format is the third highest. The display preferential order of the tag content 804 of "Pet" (see Area R36) which is associated with the file type "png" that does not belong to the "Office" file fox mat is the fourth highest. The display preferential order of the tag content 804 of "Travel" (see Area R37) which is associated with the file type "jpg" that does not belong to the "Office" file format is the fifth highest. The relay apparatus 200 creates tag selection screen data based on the stored tag ID 803 and the tag content 804 that are rearranged (S424) and transmits the created tag selection screen data to the multi-function device 100 (S426).

Upon receiving the tag selection screen data (S230: YES), the multi-function device 100 displays the tag selection screen on the display unit 150 (S232). Due to this, as shown in the tag selection screen 502 of FIG. 16, the selected tag data "Work," "Meeting Minutes," "Material," "Pet," and "Travel" are displayed in a state of being arranged in that order from top to bottom of the display unit 150.

When the user A selects a tag associated with the electronic data to be uploaded, the selected tag data is acquired (S235: YES). The multi-function device 100 transmits the selected tag identification information to the relay apparatus 200 (S236). Upon receiving the selected tag identification information from the multi-function device 100 (S428: YES), the relay apparatus 200 generates an upload execution command (S430) and adds the upload execution command to the selected tag identification information (S434). The relay apparatus 200 transmits the upload execution command to the multi-function device 100 (S436). Upon receiving the upload execution command from the relay apparatus 200 (S238: YES), the multi-function device 100 executes reading of images (S240).

The multi-function device 100 transmits an upload destination acquisition URL request to the relay apparatus 200 (S246). Upon receiving the upload destination acquisition URL request from the multi-function device 100 (S440: YES), the relay apparatus 200 transmits UL-information-request information to the service providing apparatus 300A (S442). Upon receiving the upload destination URL from the service providing apparatus 300A (S444: YES), the relay apparatus 200 creates first combination information and a template for the upload message (S446). The relay apparatus 200 transmits the first combination information, the upload destination URL, and a template for an upload message to the multi-function device 100 (S448). Upon receiving the first combination information, the upload destination URL, and the template for an upload message from the relay apparatus 200 (S247: YES), the multi-function device 100 creates the upload message (S248). The multi-function device 100 transmits the upload message to the service providing apparatus 300A (S249). Upon receiving upload result information and electronic data identification information from the service providing apparatus 300A (S254: YES), the multi-function device 100 creates second combination information and transmits the same to the relay apparatus 200 (S258).

Upon receiving the second combination information from the multi-function device 100 (S462: YES), the relay apparatus 200 decodes the upload result information and creates a decoding result (S466). The relay apparatus 200 transmits the electronic data identification information and the tagging instruction information to the service providing apparatus 300A (S470). Upon acquiring the tagging result information from the service providing apparatus 300A (S472), the relay apparatus 200 updates the use history 808 of the tag table 280 (S474). The relay apparatus 200 transmits the determination result information and the tagging result information to the multi-function device 100 (S476). Upon receiving the determination result information and the tagging result information from the relay apparatus 200 (S262: YES), the multi-function device 100 displays on the display unit 150 whether the upload has succeeded (S263).

When electronic data related to the image read by the scanner unit 170 other than the electronic data that has been uploaded is stored in the information storage unit 130 (S268: YES), the processes that start with the process (S246) of acquiring the upload destination URL and end with the process (S263) of displaying whether the upload has succeeded are executed again. When the upload has been completed for the electronic data of all images (S268: NO), the multi-function device 100 displays a message on the display unit 150 indicating the proper completion of the process (S281).

<Advantages>

In the service cooperation system 10 disclosed in the present exemplary embodiment, the process (for example, steps S318 and S470) of associating tag data with the electronic data uploaded to the service from the multi-function device 100 can be executed by the relay apparatus 200. Due to this, it is possible to eliminate the need to store programs and the like (for example, the tag list request program 233 and the tagging instruction program 231) for executing the process of associating tag information in the multi-function device 100. Moreover, it is possible to eliminate the need to cause the multi-function device 100 to execute updating or the like of these programs. Therefore, it is possible to prevent a situation in which the volume of the information storage unit 130 of the multi-function device 100 decreases or the communication capability or the processing capability of the multi-function device 100 decreases.

The tag data associated with the electronic data to be uploaded depends on the file type of the electronic data. For example, when the file type of electronic data is a photo, tag data (for example, the name of a person included in an image, the name of a place where the image is captured, and the like) that represents the content of an image is often associated. In the service cooperation system 10 disclosed in the present exemplary embodiment, the stored tag data related to the file type of the electronic data to be uploaded can be displayed on the display unit 150 as a candidate for the tag data to be associated with the electronic data preferentially to the stored tag data that is not related to the file type of the electronic data (steps S350, S354, and S232). Due to this, since the stored tag data that is highly likely to be selected by the user is displayed preferentially even when there is a large number of stored tag data, it is possible to prevent deterioration in the operability when selecting desired tag data from a plurality of stored tag data.

The stored tag data related to the file type of the electronic data to be uploaded can be identified based on the extension added to the file (S342). Due to this, the stored tag data that is highly likely to be selected by the user can be displayed preferentially.

The display preferential order of a tag of which the last used date 807 is newer is set to the highest when the stored tag ID 803 and the tag content 804 are rearranged (S354). Due to this, the stored tag data having a higher use frequency can be displayed as a candidate for the tag data to be associated with the electronic data preferentially to the stored tag data having a lower use frequency. Thus, it is possible to improve the operability when selecting the tag data.

The stored tag data that is associated with the file type (for example, xls or pdf) included in the specific file format (for example, "Office" format) to which the file type (for example, doc) of the electronic data to be uploaded can be displayed on the display unit 150 as a candidate for the tag data preferentially to the stored tag data associated with the file type (for example, jpg or png) that is not included in the specific file format (steps S350, S354, and S232). Due to this, the stored tag data that is highly likely to be selected by the user can be displayed preferentially.

When a plurality of electronic data is uploaded by one process and the file type of at least one of the plurality of electronic data belongs to the "Office" format, it is considered that the plurality of electronic data is highly likely to be a group of electronic data related to a document. An example of a group of electronic data related to a document is document data and picture data attached to the document data. In such a case, in the service cooperation system 10 disclosed in the present exemplary embodiment, stored tag data related to the "Office" format can be displayed preferentially as a candidate for tag data to be associated with the group of electronic data. Due to this, it is possible to improve the operability when selecting tag data.

When a shared account corresponding to a selected service is present (S331: YES), it is possible to acquire stored tag data stored in the storage area for the shared account (S332). Due to this, since the range of candidates for tag data can be expanded, it is possible to improve the operability when selecting the tag data.

The information on the tag data stored in the service providing apparatus 300A by each of the plurality of multi-function devices 100 and 101 can be understood by one relay apparatus 200. Due to this, the tag data generated by any one of the plurality of multi-function devices 100 and 101 can be controlled so as not to be displayed in any one of the plurality of multi-function devices 100 and 101.

The service providing apparatus 300 can provide a storage area to each of a plurality of users by identifying the plurality of respective users based on the user IDs (S196: YES). Moreover, the service providing apparatus 300 can acquire stored tag data corresponding to the plurality of respective users. Thus, the stored tag data used in the past by the plurality of displayed on the display unit 150 for each of the plurality of users.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

<Modifications>

Step S342, the method of determining the file type of electronic data is not limited to the method based on the extension. For example, file type identification information for identifying the file type of electronic data may be assigned by the service to the electronic data that is uploaded to the service. Moreover, file type identification information may be acquired when the relay apparatus 200 acquires the tag list from the service (S320). Moreover, the file type of the electronic data may be determined based on the acquired file type identification information in step S342. Due to this, the file type of electronic data having a file format of which the extension is not present can be also determined. An example of electronic data having the file format of which the extension is not present includes a file created by presentation software, electronic data edited by image editing software, and the like.

The content described as the file type 805 is an example. The technique disclosed in the present specification can be also applied to file types other than the types disclosed in the present specification. Moreover, although "Office" and "Picture" have been described as examples of the file format 806, these are examples and other formats may also be used.

In the rearranging process of steps S354 and S350, it may be controlled so that tag data having a higher use frequency is set to a higher display preferential order. In this case, tag data having a higher use count that is represented by the use history 808 may be set to a higher display preferential order.

The process of rearranging the tag data so that the office format or the picture format is displayed preferentially, executed in steps S320 to S354 is not limited to the embodiment in which the process is executed by the relay apparatus 200. The rearranging process may be executed by the multi-function devices 100 and 101. In this case, the multi-function devices 100 and 101 may store the tag table 280. Moreover, the steps corresponding to the steps S362 to S378 may be inserted between the steps S213 and S230. Due to this, the control of displaying the tags of the office format or the picture format preferentially when displaying the stored tag data stored in the service providing apparatus 300 on the display unit 150 as selection candidates (S232) can be performed without the aid of the relay apparatus 200.

In the present exemplary embodiment, although the case where the area where the electronic data is stored is the service providing apparatus 300, the present invention is not limited to this embodiment. For example, the technique disclosed in the present specification can also be applied to a case where the area where the electronic data is stored is the information storage unit 130 of the multi-function device 100. In this ease, in the present exemplary embodiment, the service providing apparatus 300 may be regarded as the information storage unit 130, and the relay apparatus 200 may be regarded as the control unit 120. Further, the process (S195) of selecting a service may be omitted. The login process (S196) may be regarded as the login process to the multi-function device 100. The tag table 280 may be stored in the information storage unit 130. Due to this, the flowcharts of FIGS. 3 to 9 represent the processes performed inside the multi-function device 100. Therefore, the process of associating the tag data to the electronic data stored in the information storage unit 130 of the multi-function device 100 can be executed by the multi-function device 100. Moreover, the tags can be displayed so that the office format or the picture format is displayed preferentially when displaying the stored tag data associated with the stored electronic data stored in the information storage unit 130 on the display unit 150 as selection candidates (S232). 101201 Generated new selected tag data may be received on the tag selection screen displayed on the display unit 150 in step S232. For example, an input box for receiving the input of a character string of a tag may be displayed on the tag selection screen. Moreover, when the input of the character string has been received via the operation unit 180, new selected tag data may be generated based on the input character string.

The types of information included in the first or second combination information are examples. Other types of information may be included in the first or second combination information, and the information described in the present exemplary embodiment may be not included.

An embodiment where the first or second combination information uses a layered structure has been described. (For example, a case where the second combination information has a structure that combines the upload notification information and the upload result information in addition to the first combination information has been described. Moreover, a case where the upload notification information includes the tagging request information and the electronic data identification information has been described.) However, the layered structure may have various embodiments because it is only necessary to communicate information required for the respective processes. For example, the second combination information may include a result information destination address, selected tag identification information, tagging request information, electronic data identification information, upload result information, and the like.

In step S446, although a case where the control unit of the relay apparatus 200 creates the template for the upload message has been described, the present invention is not limited to this. For example, the templates corresponding to the respective services may be stored in advance in the information storage unit 230, and the relay apparatus 200 may transmit the stored templates to the multi-function device 100.

In the present exemplary embodiment, an embodiment where the multi-function device 100 transmits the upload result information received from the service providing apparatus 300 to the relay apparatus 200 and the relay apparatus 200 decodes the upload result information has been described. However, the present invention is not limited to this embodiment, and for example, the process of decoding the upload result information may be omitted. In this case, for example, the process of creating the decoding result in step S466 may be also omitted. Moreover, the second combination information generated in step S258 may not include the upload result information.

in the above embodiment, although the URL is described as an example of the address of the upload destination, the present invention is not limited to this. The upload destination address may be information that is added to the URL as an option and may be information that is included in the body portion of HTTP communication.

There are various embodiments that allow the multi-function device 100 and the relay apparatus 200 to perform upload or the like of electronic data in cooperation, and for example, the following embodiment may be employed. The relay apparatus 200 acquires, from the electronic data storing service, the upload destination URL which is the URL of the upload destination of the electronic data to the electronic data storing service. The multi-function device 100 transmits the electronic data to be uploaded to the relay apparatus 200. The relay apparatus 200 uploads the electronic data to the electronic data storing service using the upload destination URL.

The invention claimed is:

1. A relay apparatus configured to communicate with a storage device,
the relay apparatus comprising:
a processor,
a network interface configured to communication with an image processing device; and
a memory configured to store computer-readable instructions therein, the computer-readable instructions, when executed by the processor, causing the relay apparatus to perform:
acquiring, from the image processing device via the network interface, send file type information indicating a file type of a send file,
the send file being a file to be sent to the storage device and to be stored in the storage device;
determining the file type of the send file based on the acquired send file type information;
acquiring a plurality of stored tag information from the storage device via the network interface,
the stored tag information being tag information associated with a stored file which is a file stored in the storage device;
causing the image processing device to display a first group of stored tag information in preference to a second group of stored tag information, by sending stored tag display information to the image processing device via the network interface in a case where the determining determines the file type of the send file,
the first group of stored tag information being tag information associated with a first group of stored file which is related to the determined file type of the send file, and
the second group of stored tag information being tag information associated with a second group of stored file which is not related to the determined file type of the send file;
acquiring at least one selected tag information from the image processing device via the network interface after the stored tag display information is sent; and
storing, in association with the send file, the acquired at least one selected tag information into the storage device,
the selected tag information being tag information selected from among the one or more stored tag information displayed on the image processing device.

2. The relay apparatus as in claim 1, wherein
the computer-readable instructions cause the relay apparatus to further perform:
acquiring stored file information from the storage device via the network interface, the
stored file information being information related to a file type of the stored file, and the
causing includes identifying the first group of stored tag information based on the acquired stored file information.

3. The relay apparatus as in claim 1, wherein
the acquiring of the plurality of stored tag information includes acquiring use frequency information that indicates use frequency for each of the plurality of stored tag information,
the causing includes causing the image processing device to display the first group of stored tag information based on the use frequency information such that highly-used tag information is displayed in a preferential manner.

4. The relay apparatus as in claim 1, wherein
the file type of send file belongs to a specific file format among a plurality of file formats, in a case where a plurality of stored files in the storage device includes the first group of stored file belonging to the specific file format, the second group of stored file belonging to the specific file format, and a third group of stored file not belonging to the specific file format,
the causing includes causing the image processing device to display the second group of stored tag information in preference to a third group of stored tag information,
the third group of stored tag information being tag information associated with third group of stored file.

5. The relay apparatus as in claim 4, wherein
the plurality of file formats includes a document file format to which a file type of a file related to a document belongs,
in a case where a plurality of send files is to be sent to the storage device at one time and the plurality of send files includes both at least one send file having a file type belonging to the document file format and at least one send file having a file type not belonging to the document file format,
the causing includes causing the image processing device to display the first group of stored tag information and the second group of stored tag information in preference to the third group of stored tag information, and
the storing includes storing, in association with the plurality of send files, the at least one selected tag information into the storage device.

6. The relay apparatus as in claim 1, wherein
the storing device comprises storage area that stores a plurality of files and a plurality of tag information, the storage area being provided for each of a plurality of user identification information,
the computer-readable instructions cause the relay apparatus to further perform:
causing the storage device to store the send file in a specific storage area identified by specific user identification information selected from among the plurality of user identification information, and
the acquiring of the plurality of stored tag information includes acquiring, from the storage device, the plurality of stored tag information associated with a stored file stored in the specific storage area.

7. The relay apparatus as in claim 6, wherein
the acquiring of the plurality of stored tag information includes acquiring, from the storage device, stored tag information associated with a stored file stored in a storage area identified by another user identification information, in a case where the other user identification information exists,
the other user identification information being user identification information that is available for use and is different from the specific user identification information.

8. The relay apparatus as in claim 2, wherein
the stored file information includes character strings of extension added to a file name of the stored file.

9. The relay apparatus as in claim 1, wherein
the information processing device is connected to the relay apparatus via the network.

10. The relay apparatus as in claim 1,
wherein
the image processing device is a scanner generating a file based ~ on scan data, the send file type information is information indicating a file type of the file generated by the scanner, and the determining includes determining, in a case where the send file type information is acquired from the scanner via the network interface, the file type of the send file based on the acquired send file type information.

11. The relay apparatus as in claim 10, wherein the causing includes sending stored tag display information to the scanner via the network interface in a case where the determining determines the file type of the send file, the stored tag display information being for causing the scanner to display the first group of stored tag information in preference to the second group of stored tag information, and the storing includes sending instruction information to the scanner via the network interface, in the case where the selected tag information is acquired from the scanner via the network interface after the stored tag display information is sent, the instruction information being for causing the scanner to:
generate the send file based on scan data, and
require the storage device to store, in association with the generated send file, at least one of the selected tag information into the storage device.

12. The relay apparatus information processing device as in claim 10, wherein the computer-readable instructions cause the relay apparatus to further perform:

sending first display information to the scanner via the network interface in a case where requirement information is received from the scanner,
the first display information being information for causing the image processing device to display a processing selection image for receiving a selection on executing one of a first storage process and a second storage process,
the first storage process being for storing a first file generated by the scanner based on scan data, and
the second storage process being for storing a second file selected from among a plurality of files stored in the scanner;

sending second display information to the scanner via the network interface in a case where information indicating the selection of the first storage process is received from the scanner,
the second display information being information for causing the image processing device to display a type selection image for receiving a selection on a type of the send file to be generated from among a plurality of types of files; and sending third display information to the scanner via the network interface in a case where information indicating the selection of the second storage process is received from the scanner,
the third display information being information for causing the image processing device to display a file selection image for receiving a selection on a file to be selected as the second file,
wherein:
the storing includes sending instruction information to the scanner via the network interface in a case where the stored tag display information is sent and in a case where the selected tag information is acquired from the scanner via the network interface, after the second display information is sent to the scanner and the send file type information is acquired from the scanner via the network interface, the instruction information being for causing the scanner to:
generate the send file based on scan data, and
require the storage device to store, in association with the generated send file, at least one of the selected tag information into the storage device; and the storing includes sending instruction information to the scanner via the network interface in the case where the stored tag display information is sent and in the case where the selected tag information is acquired from the scanner via the network interface, after the third display information is sent to the scanner and the send file type information including the file name of the send file is acquired from the scanner via the network interface, the instruction information being for causing the scanner to require the storage device to store, in association with the send file having the file name included in the send file type information, at least one of the selected tag information into the storage device.

13. The relay apparatus as in claim 1, wherein the send file type information includes a file name of the send file, the determining includes determining, in a case where the send file type information including the file name of the send file is acquired from the image processing device via the network interface, the file type of the send file based on the file name included in the € -he send file type information, and the storing includes storing, in association with the send file having the file name included in the send file type information, at least one of the selected tag information into the storage device.

14. The relay apparatus as in claim 1, wherein the storing includes sending instruction information to the image processing device via the network interface, the instruction information being for causing the image processing device to require the storage device to store, in association with the send file, at least one of the selected tag information into the storage device.

15. An image processing device configured to communicate with a storage device and a relay apparatus, the image processing device comprising:

a processor;
a network interface;
a user interface; and
a memory configured to store computer-readable instructions therein, the computer-readable instructions, when executed by the processor, causing the image processing device to perform:

sending send file type information to the relay apparatus via the network interface, the send file type information indicating a file type of a send file, and
the send file being a file to be sent to the storage device and to be stored in the storage device;

causing a display unit of the image processing device to display a first group of stored tag information in preference to a second group of stored tag information in a case where stored tag display information is acquired from the relay apparatus via the network interface after the send file type information is sent, the first group of stored tag information being tag information associated with a first group of stored file which is related to the file type of the send file, the second group of stored tag information being tag information associated with a second group of stored file which is not related to the file type of the send file, the stored tag display information being for causing the display unit to display a plurality of stored tag information, and the plurality of stored tag information being tag information associated with a stored file which is a file stored in the storage device; and storing, in association with the send file, at least one selected tag information into the storage device in a case where a user input selecting at least one of selected tag information is acquired via the user interface after the plurality of stored tag information is displayed, the selected tag information being tag information selected from among the plurality of stored tag information displayed on the display unit.

16. The image processing device as in claim 15, wherein the computer-readable instructions cause the image processing device to further perform: generating a file based on scan data, wherein the sending includes sending send file type information, indicating the file type of the generated file, to the relay apparatus via the network interface.

17. The image processing device as in claim 15, wherein the sending includes sending send file type information including a file name of the send file, and the storing includes storing, in association with the send file having the file name included in the send file type information, at least one of the selected tag information into the storage device.

18. The image processing device as in claim 15, wherein the storing includes storing, in association with the send file, at least one of the selected tag information into the storage device in a case where instruction information is received from the relay apparatus via the network interface, the instruction information being for causing the storage device to store, in association with the send file, at least one of the selected tag information into the storage device.

19. The image processing device as in claim 15, wherein: the causing includes causing the display unit to display a first group of stored tag information in preference to a second group of stored tag information in the case where stored tag display information is acquired from the relay apparatus via the network interface after the send file type information indicating a file type of the file generated by the generating is sent to the relay apparatus via the network interface, the first group of stored tag information being tag information associated with a first group of stored file which is related to the file type of the send file, the second group of stored tag information being tag information associated with a second group of stored file which is not related to the file type of the send file; and the storing includes:

generating the send file based on scan data; and storing, in association with the generated send file, at least one selected tag information into the storage device, the selected tag information being tag information selected from among the plurality of stored tag information displayed on the display unit.

20. The image processing device in claim 15, wherein the computer-readable instructions cause the image processing device to further perform:

causing the display unit to display a processing selection image for receiving a selection on executing one of a first storage process and a second storage process, the first storage process being for storing a first file generated by the image processing device based on scan data, and the second storage process being for storing a second file selected from among a plurality of files stored in the image processing device;

causing the display unit to display a type selection image for receiving a selection on a type of the send file to be generated from among a plurality of types of files in a case where a user input indicating the selection of the first storage process is accepted via the user interface; and causing the display unit to display a file selection image for receiving a selection on a file to be selected as the second file in a case where a user indicating the selection of the second storage process is accepted via the user interface, wherein the storing includes:

generating the send file based on scan data; and storing, in association with the generated send file, at least one selected tag information into the storage device, in a case where a plurality of stored tag information is displayed and a user input selecting at least one of selected tag information is acquired via the user interface, after the type selection image is displayed and a user input indicating a selection of a file type of the send file is acquired via the user interface, and the selected tag information being tag information selected from among the plurality of stored tag information displayed on the display unit, and the storing includes storing, in association with the send file having the file name included in the send file type information, at least one of the selected tag information into the storage device in a case where a plurality of stored tag information is displayed and a user input selecting at least one of selected tag information is acquired via the user interface, after the file selection image is displayed and a user input indicating a selection of a send file via the user interface.

21. A non-transitory computer-readable storage medium storing a computer program for a relay apparatus configured to communicate with a storage device, the relay apparatus comprising a network interface configured to communication with an image processing device, the computer program including instructions for causing a processor of the relay apparatus to operate as:

acquiring, from the image processing device via the network interface, send file type information indicating a file type of a send file, the send file being a file to be sent to the storage device and to be stored in the storage device;

determining the file type of the send file based on the acquired send file type information;

acquiring a plurality of stored tag information from the storage device via the network interface, the stored tag information being tag information associated with a stored file which is a file stored in the storage device;
causing the image processing device to display a first group of stored tag information in preference to a second group of stored tag information, by sending stored tag display information to the image processing device via the network interface in a case where the determining determines the file type of the send file,
the first group of stored tag information being tag information associated with a first group of stored file which is related to the determined file type of the send file, and
the second group of stored tag information being tag information associated with a second group of stored file which is not related to the determined file type of the send file;
acquiring at least one selected tag information from the image processing device via the network interface after the stored tag display information is sent; and
storing, in association with the send file, the acquired at least one selected tag information into the storage device,
the selected tag information being tag information selected from among the one or more stored tag information displayed on the image processing device.

22. A method for controlling a relay apparatus configured to communicate with a storage device,
the relay apparatus comprising a network interface configured to communication with an image processing device,
the method comprising:
acquiring, from the image processing device via the network interface, send file type information indicating a file type of a send file,
the send file being a file to be sent to the storage device and to be stored in the storage device;
determining the file type of the send file based on the acquired send file type information;
acquiring a plurality of stored tag information from the storage device via the network interface,
the stored tag information being tag information associated with a stored file which is a file stored in the storage device;
causing the image processing device to display a first group of stored tag information in preference to a second group of stored tag information, by sending stored tag display information to the image processing device via the network interface in a case where the determining determines the file type of the send file,
the first group of stored tag information being tag information associated with a first group of stored file which is related to the determined file type of the send file, and
the second group of stored tag information being tag information associated with a second group of stored file which is not related to the determined file type of the send file;
acquiring at least one selected tag information from the image processing device via the network interface after the stored tag display information is sent; and
storing, in association with the send file, the acquired at least one selected tag information into the storage device,
the selected tag information being tag information selected from among the one or more stored tag information displayed on the image processing device.

23. An information processing device configured to communicate with a storage device,
the information processing device comprising: a processor;
a network interface configured to communicate with a scanner, the scanner generating a file based on scan data; and
a memory configured to store computer-readable instructions therein, the computer-readable instructions, when executed by the processor, causing the information processing device to perform:
sending first display information to the scanner via the network interface in a case where requirement information is received from the scanner,
the first display information being information for causing the scanner to display a processing selection image for receiving a selection on executing one of a first storage process and a second storage process,
the first storage process being for storing a first file generated by the scanner based on scan data, and
the second storage process being for storing a second file selected from among a plurality of files stored in the scanner;
sending second display information to the scanner via the network interface in a case where information indicating the selection of the first storage process is received from the scanner,
the second display information being information for causing the scanner to display a type selection image for receiving a selection on a type of the send file to be generated from among a plurality of types of files;
sending third display information to the scanner via the network interface in a case where information indicating the selection of the second storage process is received from the scanner,
the third display information being information for causing the scanner to display a file selection image for receiving a selection on a file to be selected as the second file,
acquiring from the scanner via the network interface, send file type information indicating a file type of a send file generated by the scanner,
the send file being a file to be sent to the storage device and to be stored in the storage device;
determining the file type of the send file based on the acquired send file type information;
acquiring a plurality of stored tag information from the storage device via the network interface,
the stored tag information being tag information associated with a stored file which is a file stored in the storage device;
causing the scanner to display a first group of stored tag information in preference to a second group of stored tag information, by sending stored tag display information to the scanner via the network interface in a case where the determining determines the file type of the send file,
the first group of stored tag information being tag information associated with a first group of stored file which is related to the determined file type of the send file, and
the second group of stored tag information being tag information associated with a second group of stored file which is not related to the determined file type of the send file;

acquiring at least one selected tag information from the image processing device via the network interface after the stored tag display information is sent; and storing, in association with the send file, the acquired at least one selected tag information into the storage device, the selected tag information being tag information selected from among the one or more stored tag information displayed on the scanner, wherein the storing includes sending instruction information to the scanner via the network interface in a case where the stored tag display information is sent and in a case where the selected tag information is acquired from the scanner via the network interface, after the second display information is sent to the scanner and the send file type information is acquired from the scanner via the network interface, the instruction information being for causing the scanner to:

generate the send file based on scan data, and require the storage device to store, in association with the generated send file, at least one of the selected tag information into the storage device; and the storing includes sending instruction information to the scanner via the network interface in the case where the stored tag display information is sent and in the case where the selected tag information is acquired from the scanner via the network interface, after the third display information is sent to the scanner and the send file type information including the file name of the send file is acquired from the scanner via the network interface, the instruction information being for causing the scanner to require the storage device to store, in association with the send file having the file name included in the send file type information, at least one of the selected tag information into the storage device.

* * * * *